US012578093B2

(12) United States Patent
Hahm et al.

(10) Patent No.: US 12,578,093 B2
(45) Date of Patent: Mar. 17, 2026

(54) GAS TURBINE ENGINE COMBUSTOR

(71) Applicant: General Electric Company, Schenectady, NY (US)

(72) Inventors: Trevor James Hahm, Cincinnati, OH (US); Daniel J. Kirtley, Blue Ash, OH (US); Shai Birmaher, Cincinnati, OH (US); Ryan Christopher Jones, West Chester, OH (US); Erich Alois Krammer, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/604,911

(22) Filed: Mar. 14, 2024

(65) Prior Publication Data

US 2025/0290632 A1 Sep. 18, 2025

(51) Int. Cl.
*F23R 3/00* (2006.01)
*F23R 3/60* (2006.01)

(52) U.S. Cl.
CPC .............. *F23R 3/002* (2013.01); *F23R 3/007* (2013.01); *F23R 3/60* (2013.01); *F05D 2240/35* (2013.01); *F05D 2260/30* (2013.01); *F05D 2300/6033* (2013.01)

(58) Field of Classification Search
CPC .. F23R 3/002; F23R 3/007; F23R 3/50; F23R 3/60
See application file for complete search history.

(56) References Cited

U.S. PATENT DOCUMENTS

| | | | | |
|---|---|---|---|---|
| 7,967,562 | B2 | 6/2011 | Frost et al. | |
| 10,197,278 | B2 | 2/2019 | Bloom et al. | |
| 10,234,141 | B2 | 3/2019 | Vargas | |
| 10,330,136 | B2 | 6/2019 | DiChiara, Jr. et al. | |
| 10,533,747 | B2 | 1/2020 | Corsmeier et al. | |
| 11,255,370 | B2 | 2/2022 | Pinney | |
| 11,585,241 | B2 | 2/2023 | Danis et al. | |
| 11,781,753 | B2 | 10/2023 | Ganiger et al. | |
| 11,828,466 | B2 | 11/2023 | Salazar Lois et al. | |
| 2004/0118122 | A1* | 6/2004 | Mitchell | F23R 3/60 60/752 |
| 2010/0143069 | A1 | 6/2010 | Moore | |
| 2017/0059167 | A1* | 3/2017 | Bloom | F23R 3/007 |
| 2023/0313992 | A1* | 10/2023 | Chiranthan | F23R 3/60 60/752 |

* cited by examiner

*Primary Examiner* — Scott J Walthour
(74) *Attorney, Agent, or Firm* — Venable LLP; Edward Kmett; Michele V. Frank

(57) ABSTRACT

A combustor for a gas turbine engine includes a dome structure having an outer dome connecting flange, a cowl structure, an outer liner having an outer liner connecting flange, and an inner liner having an inner liner connecting flange. At least one of (a) the outer liner connecting flange includes a bushing having an opening therethrough, or (b) the outer dome connecting flange includes a bushing having an opening therethrough. The outer dome connecting flange, the cowl structure, and the outer liner are connected together via an outer connection that includes an outer connecting member having a head and a shank. An outer surface of the head slidingly engages with at least one of (i) an inner surface of the opening of the bushing in the outer liner connecting flange, or (ii) an inner surface of the bushing in the outer dome connecting flange.

16 Claims, 15 Drawing Sheets

GAS TURBINE ENGINE COMBUSTOR

TECHNICAL FIELD

The present disclosure relates to a combustor for a gas turbine engine.

BACKGROUND

Gas turbine engines generally include a combustor. The combustor may be an annular combustor that includes a combustor liner, which may include an outer liner and an inner liner that are connected to a dome, with a combustion chamber being defined between the inner liner and the outer liner. The outer liner and the inner liner may also be connected to a cowl structure. The cowl structure may generally be a metallic structure, while in some cases, the outer liner and the inner liner may be formed of a ceramic matrix composite (CMC) material. In some cases, the dome may also be formed of a CMC material.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
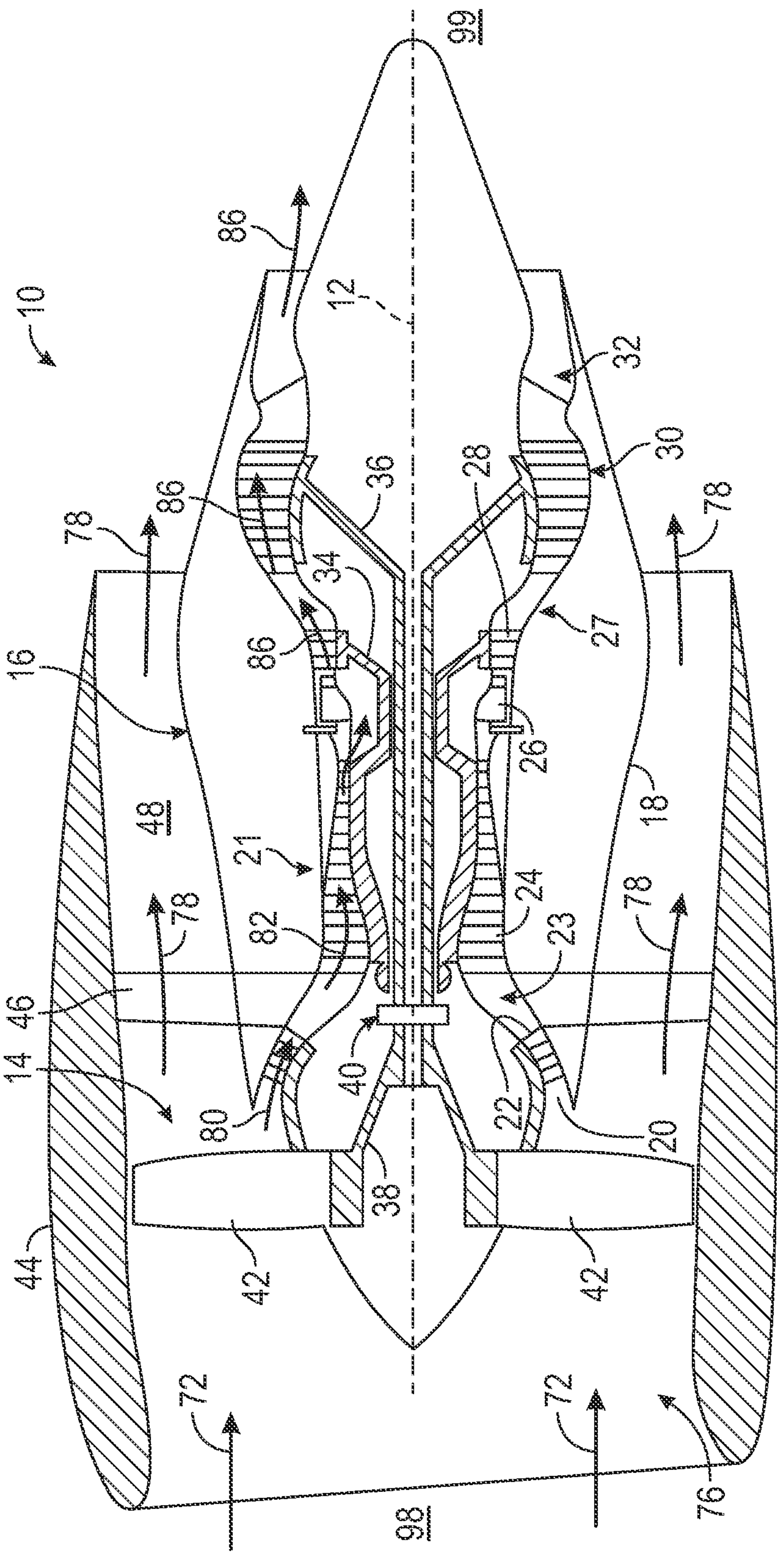
FIG. 1 is a schematic cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "outer" and "inner" refer to the relative direction with respect to a radial direction extending outward from a centerline axis. For example, "outer" refers to an element or a part of an element (e.g., a side of an element) further away from the centerline axis in the radial direction, and "inner" refers to an element or a part of an element (e.g., a side of an element) closer to the centerline axis in the radial direction.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms “circumferential” and “circumferentially” refer to directions and orientations that extend arcuately about the centerline of the turbine engine.

The singular forms “a,” “an,” and “the” include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially” is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term “composite,” as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming a preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods including but not limited to melt infiltration, chemical vapor infiltration, polymer impregnation pyrolysis (PIP), or any combination thereof.

The term “metallic” as used herein is indicative of a material that includes metal such as, but not limited to, titanium, iron, aluminum, stainless steel, and nickel alloys. A metallic material or an alloy can be a combination of at least two or more elements or materials, where at least one is a metal.

The term “bushing bolt” as used herein refers to a bolt having a bolt head with a machined external diameter that slidingly engages with an internal diameter of a bushing.

Gas turbine engines generally include a combustor. The combustor may be an annular combustor that includes a combustor liner, which may include an outer liner and an inner liner that are connected to a dome structure, with a combustion chamber being defined between the inner liner and the outer liner. The outer liner, the inner liner, and the dome structure may also be connected to a cowl structure. The cowl structure may generally be a metallic structure, while, in some cases, the outer liner and the inner liner may be formed of a CMC material. In some cases, the dome structure may also be formed of a CMC material. In connecting the outer liner, the inner liner, the dome structure, and the cowl structure together, bolted joints may generally be used. In operation of the gas turbine engine, heat generated within the combustor causes the various components to expand and to contract. The bolted joints, however, form a connection that prevents, or significantly limits, axial and/or radial movement of the various structures.

The present disclosure provides a combustor in which a connection between a CMC liner to a metallic cowl structure, and to either a metallic dome structure or a CMC dome structure, is achieved so as to provide for better radial movement between and among the various components of the combustor. According to the present disclosure, the combustor includes a connection that connects a bushing of a CMC liner flange with a head of a bushing bolt such that a sliding engagement between the CMC liner flange bushing and the head of the bushing bolt occurs to allow radial movement of the CMC liner. In addition, when a CMC dome structure is included along with the CMC liner, a dome flange includes a bushing that slidingly engages with a connector bushing so as to allow radial movement of the dome structure.

FIG. 1 is a schematic cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. The present disclosure is also applicable to unducted fan (or open rotor) turbine engines. As shown in FIG. 1, the engine 10 has a longitudinal centerline axis 12 that extends therethrough from an upstream end 98 to a downstream end 99 for reference purposes. In general, the engine 10 may include a fan assembly 14 and a turbo-engine 16 disposed downstream from the fan assembly 14.

The turbo-engine 16 may generally include an outer casing 18 that defines an annular inlet 20 to a core airflow path 23 of the turbo-engine 16. The outer casing 18 encases, or at least partially forms, in serial flow relationship, a compressor section 21 having a low pressure compressor (LPC) 22 and a high pressure compressor (HPC) 24, a combustion section 26, a turbine section 27 including a high pressure turbine (HPT) 28 and a low pressure turbine (LPT) 30, and a jet exhaust nozzle section 32. A high pressure rotor shaft 34 drivingly connects the HPT 28 to the HPC 24. A low pressure rotor shaft 36 drivingly connects the LPT 30 to the LPC 22. The low pressure rotor shaft 36 may also be connected to a fan shaft 38 of the fan assembly 14. In particular embodiments, as shown in FIG. 1, the low pressure rotor shaft 36 may be connected to the fan shaft 38 by way of a reduction gearbox 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the turbo-engine 16. The nacelle 44 may be supported relative to the turbo-engine 16 by a plurality of circumferentially spaced outlet guide vanes (or struts) 46. Moreover, at least a portion of the nacelle 44 may extend over an outer portion of the turbo-engine 16 so as to define a bypass airflow passage 48 therebetween.

Figure 2:
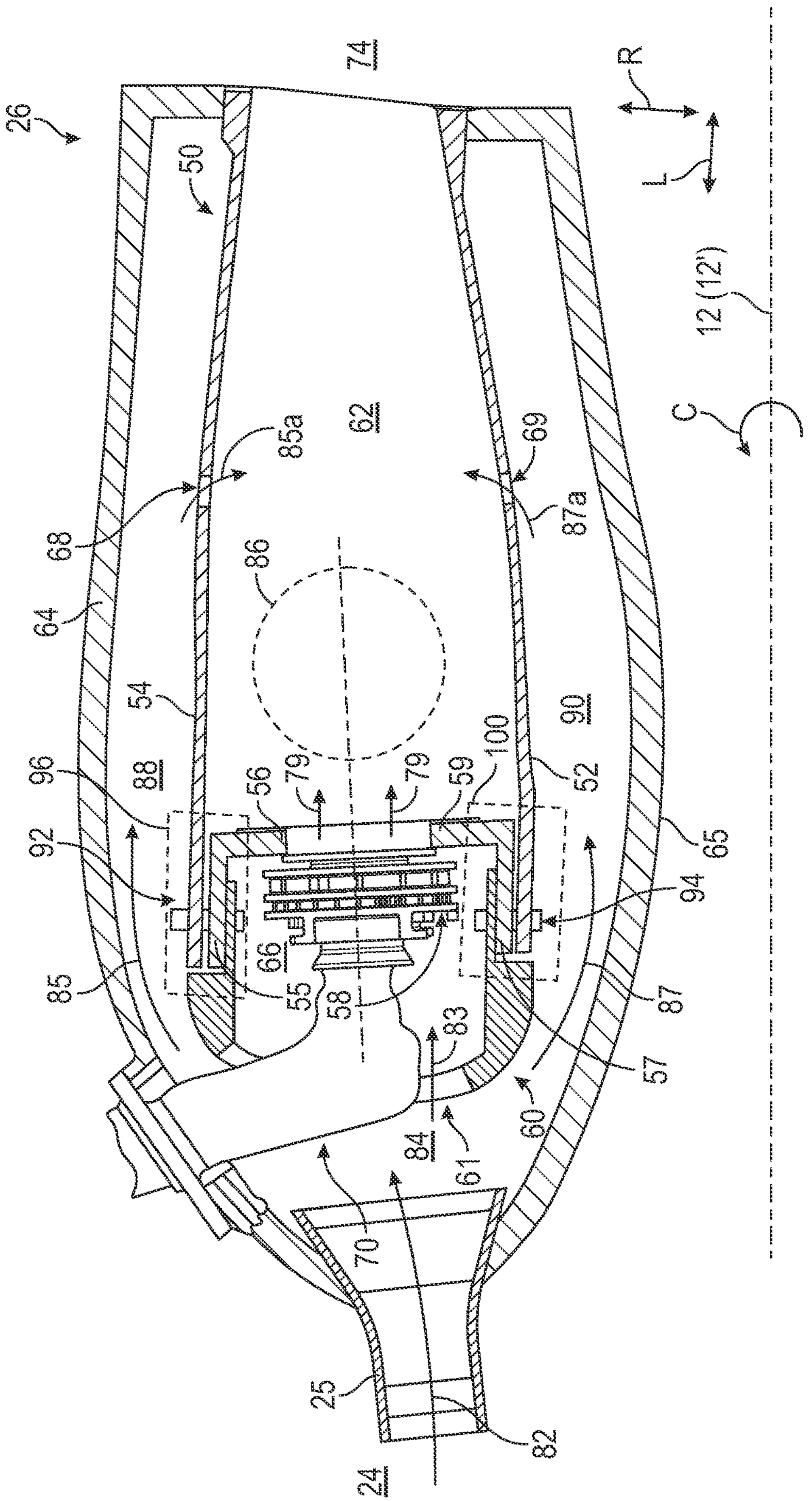
FIG. 2 is a partial cross-sectional side view of an exemplary combustor, according to an aspect of the present disclosure.

FIG. 2 is a partial cross-sectional side view of an exemplary combustion section 26 of the turbo-engine 16 as shown in FIG. 1, according to an aspect of the present disclosure. The exemplary combustion section 26 shown in FIG. 2 is an annular type combustion section that extends circumferentially about a combustor centerline axis 12', which is congruent with the longitudinal centerline axis 12 of the engine 10. While the combustion section 26 is annular about the combustor centerline axis 12', only an upper portion of the combustion section 26 is shown in the cross-sectional view of FIG. 2. The combustion section 26 includes an annular combustor outer casing 64 and an annular combustor inner casing 65 that surround a combustor 29. The combustor 29 includes an annular combustor liner 50 arranged between the annular combustor outer casing 64 and the annular combustor inner casing 65. As shown in FIG. 2, the annular combustor liner 50 includes an annular CMC inner liner 52, and an annular CMC outer liner 54, each of which extends circumferentially about the combustor centerline axis 12' so as to be annular liners. The CMC outer liner 54 and the CMC inner liner 52 may be either a single piece liner, or may be constructed of a plurality of individual sections that may be connected together so as to form the annular liner. Each of the annular CMC outer liner 54 and the annular CMC inner liner 52 is constructed of a CMC material. A dome structure 56 includes a dome plate 59 that extends between an outer dome connecting flange 55 and an inner dome connecting flange 57 of the dome structure 56. In the various aspects described below, the dome structure 56 may be constructed of a CMC material, or may be constructed of a metallic material. The dome structure 56 extends between the CMC outer liner 54 and the CMC inner liner 52, and the dome structure 56 also extends circumferentially about the combustor centerline axis 12' so as to define an annular dome structure. The dome structure 56 may be either a single piece dome structure, or may be constructed of a plurality of individual sections that may be connected together so as to form the annular dome structure 56.

As will be described in more detail below, the CMC inner liner 52 and the CMC outer liner 54 are connected to the dome structure 56, thereby defining a combustion chamber 62 therebetween. The CMC inner liner 52 and the CMC outer liner 54 extend from the dome structure 56 to a turbine nozzle 74 (depicted generally) at an entry to the HPT 28 (FIG. 1), thus, at least partially defining a hot gas path between the dome structure 56 and the HPT 28. In addition, as will be described in more detail below, a cowl structure 60 is connected to the CMC inner liner 52, to the CMC outer liner 54, and to the dome structure 56 via an outer connection 92 and via an inner connection 94, thereby defining a pressure plenum 66 therewithin. The outer connection 92 and the inner connection 94 will be described in more detail below. The cowl structure 60 extends circumferentially about the combustor centerline axis 12', and may be constructed as a single piece cowl structure, or may constitute a plurality of individual cowl sections that are connected together so as to form an annular cowl structure 60. The cowl structure 60 may generally be constructed of a metallic material.

The combustion section 26 further includes a plurality of swirler assemblies 58 (one shown in FIG. 2) that are connected to the dome structure 56 through respective openings in the dome plate 59 of the dome structure 56. In addition, a plurality of fuel nozzle assemblies 70 (one shown in FIG. 2) are connected to the combustor outer casing 64, and each fuel nozzle assembly 70 extends through a respective cowl opening 61 in the cowl structure 60, and is connected with a respective swirler assembly 58.

As shown in FIG. 2, the combustion section 26 includes a diffusor 25 and the combustor outer casing 64 and the combustor inner casing 65 are connected to the diffusor 25. The diffusor 25 is in fluid communication with the HPC 24, and, as will be described below, provides a flow of compressed air 82 into a plenum 84 defined between the combustor outer casing 64 and the combustor inner casing 65. The combustor outer casing 64 and the combustor inner casing 65 also surround the combustor liner 50, and define an outer flow passage 88 between the combustor outer casing 64 and the CMC outer liner 54, and an inner flow passage 90 between the combustor inner casing 65 and the CMC inner liner 52. The CMC outer liner 54 may include a plurality of dilution openings 68 (one shown in FIG. 2) therethrough, and the CMC inner liner 52 may include a plurality of dilution openings 69 (one shown in FIG. 2) therethrough. The dilution openings 68 provide fluid communication through the CMC outer liner 54 between the outer flow passage 88 and the combustion chamber 62, and the dilution openings 69 provide fluid communication through the CMC inner liner 52 between the inner flow passage 90 and the combustion chamber 62.

Referring collectively to FIGS. 1 and 2, during operation of the engine 10, a volume of air 72, as indicated schematically by arrows, enters the engine 10 from the upstream end 98 through an associated nacelle inlet 76 of the nacelle 44 and/or the fan assembly 14. As the air 72 passes across the fan blades 42, a portion of the air 72 is propelled by the fan blades 42 through the fan assembly 14, and is directed or routed into the bypass airflow passage 48 as a bypass airflow 78. Another portion of the air 72 is directed or routed into the LPC 22 via the annular inlet 20 as a compressor inlet air 80. The compressor inlet air 80 is progressively compressed by the LPC 22 and the HPC 24 to form the compressed air 82 as the compressor inlet air 80 flows from the annular inlet 20 through the LPC 22 and the HPC 24 towards the combustion section 26. As shown in FIG. 2, the compressed air 82 flows through the diffusor 25 and into the plenum 84 of the combustion section 26 to pressurize the plenum 84. A first portion of the compressed air 82 in the plenum 84, as indicated schematically by an arrow denoting compressed air 83, flows from the plenum 84 through the cowl opening 61 into the pressure plenum 66 of the cowl structure 60. The compressed air 83 in the pressure plenum 66 flows through the swirler assemblies 58, where the compressed air 83 is mixed with fuel provided by the fuel nozzle assemblies 70 to the swirler assemblies 58 to generate a fuel-air mixture 79. The fuel-air mixture 79 is then ejected from the swirler assemblies 58 into the combustion chamber 62, and the fuel-air mixture 79 is ignited by an ignitor (not shown) and burned within the combustion chamber 62 to generate combustion gases 86 within the combustion chamber 62.

A second portion of the compressed air 82 in the plenum 84, as indicated schematically by arrows denoting compressed air 85 and compressed air 87, may be routed into the outer flow passage 88, and into the inner flow passage 90, respectively. A portion of the compressed air 85 flowing through the outer flow passage 88, shown schematically as compressed air 85*a*, may be routed through the plurality of dilution openings 68 of the CMC outer liner 54 into the combustion chamber 62 to provide quenching of the combustion gases 86. Similarly, a portion of the compressed air 87 flowing through the inner flow passage 90, shown schematically as compressed air 87*a*, may be routed through the plurality of dilution openings 69 of the CMC inner liner 52 into the combustion chamber 62 to provide quenching of the combustion gases 86.

Referring still to FIGS. 1 and 2 collectively, the combustion gases 86 generated in the combustion chamber 62 flow into the HPT 28 (FIG. 1) via the turbine nozzle 74 (FIG. 2), thus causing the HPT 28 to rotate, which drives the high pressure rotor shaft 34, thereby driving the HPC 24 to support operation of the HPC 24. As shown in FIG. 1, the combustion gases 86 are then routed from the HPT 28 to the LPT 30, thereby causing the LPT 30 to rotate, which drives the low pressure rotor shaft 36, thereby driving the LPC 22 to support operation of the LPC 22 and/or rotation of the fan shaft 38 via the reduction gearbox 40. The combustion gases 86 are then exhausted through the jet exhaust nozzle section 32 of the turbo-engine 16 to provide propulsion at the downstream end 99 of the engine 10.

Figure 3:
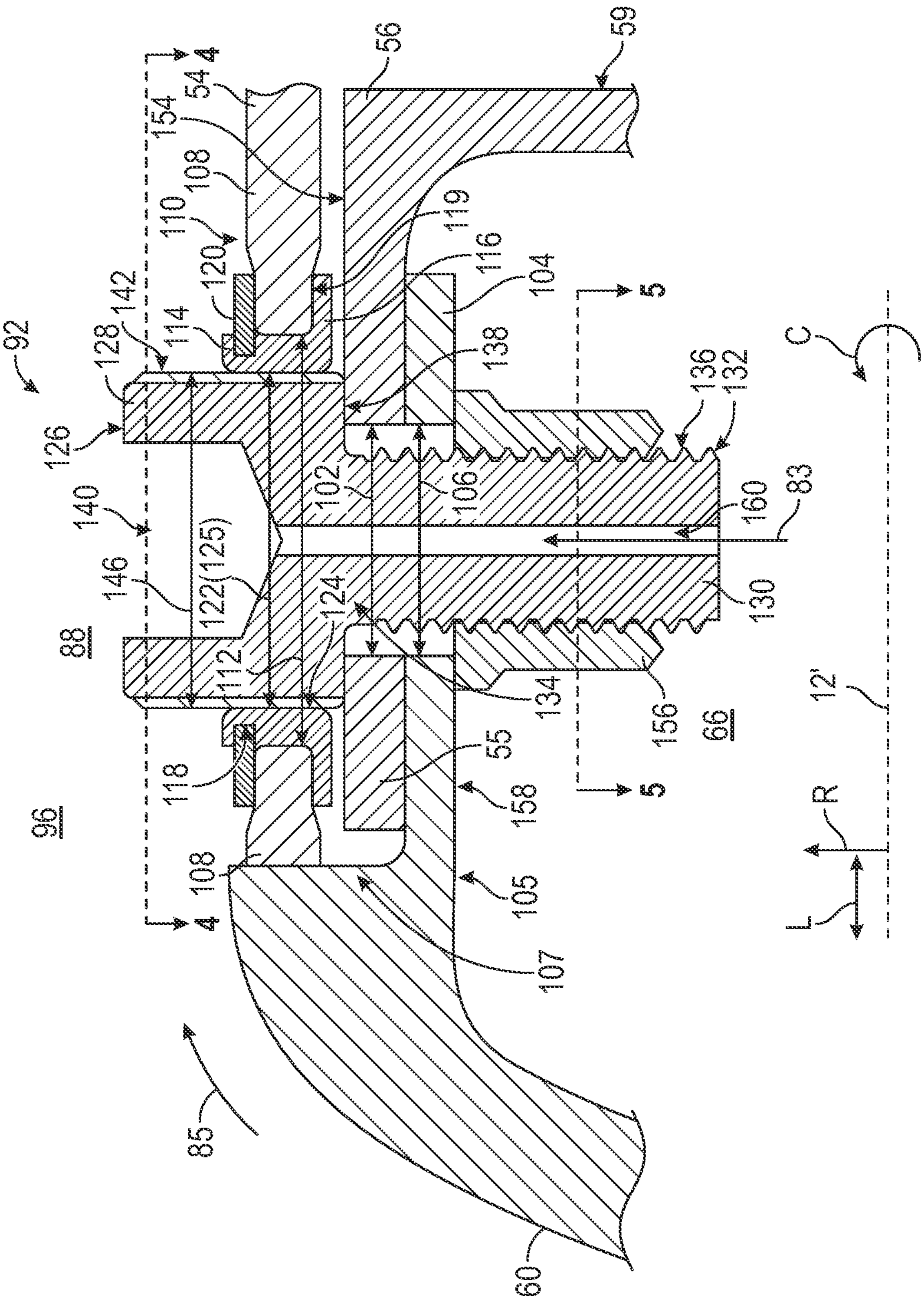
FIG. 3 is an enlarged partial cross-sectional view of an outer connection, taken at detail view 96 of FIG. 2, according to an aspect of the present disclosure.

FIG. 3 is an enlarged partial cross-sectional view of an outer connection 92, taken at detail view 96 of FIG. 2, according to an aspect of the present disclosure. As was briefly described above, the outer connection 92 connects the CMC outer liner 54, the cowl structure 60, and the dome structure 56 to each other. In the outer connection 92, the dome structure 56 includes the outer dome connecting flange 55 that is connected to the dome plate 59. The outer dome connecting flange 55 extends in a longitudinal direction L with respect to the combustor centerline axis 12'. The outer dome connecting flange 55 includes an outer dome connecting flange opening 102 therethrough. In the FIG. 3 aspect, the dome structure 56, and, thus, the outer dome connecting flange 55, may be constructed of a metallic material.

The cowl structure 60 includes an outer cowl connecting flange 104 that extends in the longitudinal direction L with respect to the combustor centerline axis 12' from an inner side 105 of an outer cowl connecting flange root portion 107 of the cowl structure 60. The cowl structure 60 is a single flange (or single yoke) cowl structure in that, the outer cowl connecting flange 104 is not part of a dual flange (or clevis-type) of connecting flange arrangement for connecting the cowl structure 60 with the CMC outer liner 54 and with the dome structure 56. The outer cowl connecting flange 104 includes an outer cowl connecting flange opening 106 therethrough. In the FIG. 3 aspect, the cowl structure 60, and, thus, the outer cowl connecting flange 104, may be constructed of a metallic material.

The CMC outer liner 54 includes an outer liner connecting flange 108 that extends in the longitudinal direction L from an upstream end 110 of the CMC outer liner 54. The outer liner connecting flange 108 includes an outer liner connecting flange opening 112 therethrough. An outer liner connecting flange bushing 114 is arranged within the outer liner connecting flange opening 112. The outer liner connecting flange bushing 114 includes a flange 116 on a first side of the outer liner connecting flange bushing 114, and a retention ring groove 118 on a second side of the outer liner connecting flange bushing 114. When the outer liner connecting flange bushing 114 is installed within the outer liner connecting flange opening 112, the flange 116 engages with an inner side 119 of the outer liner connecting flange 108, and a retention ring 120 is installed in the retention ring groove 118 to connect the outer liner connecting flange bushing 114 to the outer liner connecting flange 108. The outer liner connecting flange bushing 114 includes an outer liner connecting flange bushing opening 122 therethrough that has an inner surface 124 extending about a circumference of the outer liner connecting flange bushing opening 122. The inner surface 124 has an inner diameter 125.

The outer connection 92 further includes an outer connecting member 126 (e.g., a bushing bolt) that has an outer connector head 128 and an outer connector shank 130. The outer connector head 128 is arranged at a first end 134 of the outer connector shank 130 and includes an outer connector shoulder 138. At least a portion of a second end 136 of the outer connector shank 130 may have external threads 132. The outer connector head 128 includes a torque cavity 140 arranged within the outer connector head 128, and an outer surface 142, which may be a wear coating applied to the outer connector head 128. The wear coating may be, for example, a cobalt-molybdenum-chromium superalloy (such as Tribaloy® T-400®, T-800®, etc.).

Figure 4D:
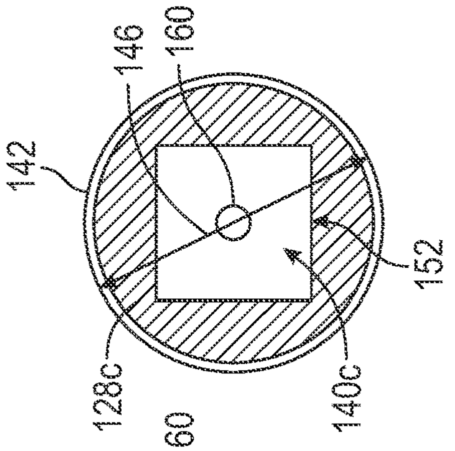
FIG. 4D depicts an alternate outer connector head to that shown in FIG. 4A, according to an aspect of the present disclosure.
Figure 4C:
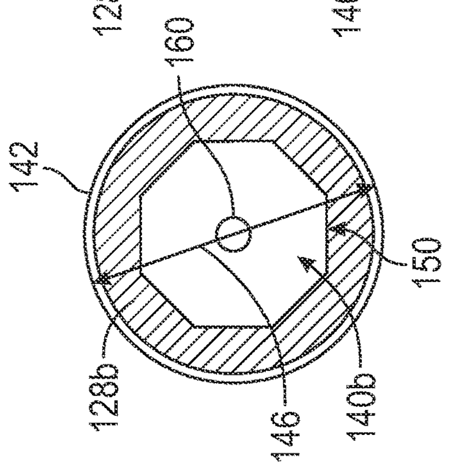
FIG. 4C depicts an alternate outer connector head to that shown in FIG. 4A, according to an aspect of the present disclosure.
Figure 4B:
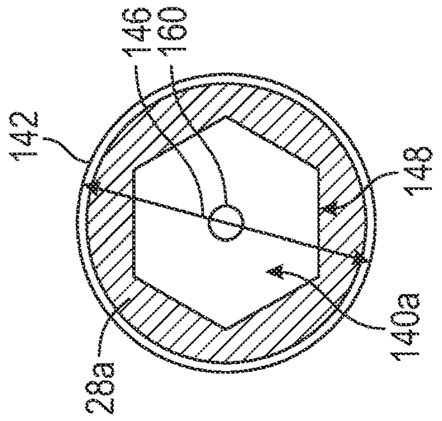
FIG. 4B depicts an alternate outer connector head to that shown in FIG. 4A, according to an aspect of the present disclosure.
Figure 4A:
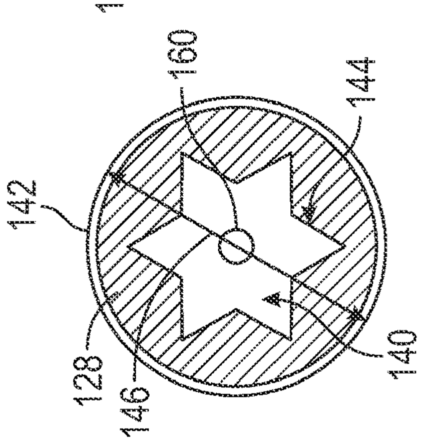
FIG. 4A is a cross-sectional view of the outer connector head, taken at plane 4-4 of FIG. 3, according to an aspect of the present disclosure.

FIG. 4A is a cross-sectional view of the outer connector head 128, taken at plane 4-4 of FIG. 3, according to an aspect of the present disclosure. In FIG. 4A, the torque cavity 140 is a star-shaped cavity 144. The star-shaped cavity 144 provides the ability to apply torque to the outer connecting member 126 (FIG. 3). In addition, the outer connector head 128 has an outer diameter 146 of the outer surface 142. The outer diameter 146 of the outer connector head 128 is machined so as to be less than the inner diameter

125 (FIG. 3) of the inner surface 124 (FIG. 3) of the outer liner connecting flange bushing opening 122 (FIG. 3) so as to allow a sliding engagement between the outer surface 142 and the inner surface 124 of the outer liner connecting flange bushing opening 122.

FIG. 4B depicts an alternate outer connector head 128*a* to that shown in FIG. 4A, according to an aspect of the present disclosure. Elements in FIG. 4B that are the same as those in FIG. 4A are labeled with the same reference numerals. In FIG. 4B, an alternate torque cavity 140*a* of the outer connector head 128*a* includes a hexagon-shaped cavity 148. The hexagon-shaped cavity 148 provides the ability to apply torque to the outer connecting member 126 (FIG. 3).

FIG. 4C depicts an alternate outer connector head 128*b* to that shown in FIG. 4A, according to an aspect of the present disclosure. Elements in FIG. 4C that are the same as those in FIG. 4A are labeled with the same reference numerals. In FIG. 4C, an alternate torque cavity 140*b* of the outer connector head 128*b* includes an octagon-shaped cavity 150. The octagon-shaped cavity 150 provides the ability to apply torque to the outer connecting member 126 (FIG. 3).

FIG. 4D depicts an alternate outer connector head 128*c* to that shown in FIG. 4A, according to an aspect of the present disclosure. Elements in FIG. 4D that are the same as those in FIG. 4A are labeled with the same reference numerals. In FIG. 4D, an alternate torque cavity 140*c* of the outer connector head 128*c* includes a square-shaped cavity 152. The square-shaped cavity 152 provides the ability to apply torque to the outer connecting member 126 (FIG. 3). FIG. 4A to FIG. 4D provide examples of cavity shapes that may be implemented in the outer connector head 128, but other shaped cavities can be implemented instead, as long as the shape provides the ability to apply torque to the outer connecting member 126 (FIG. 3).

Returning to FIG. 3, in connecting the outer connection 92, the outer connecting member 126 is inserted to extend through the outer liner connecting flange bushing 114, through the outer dome connecting flange opening 102, and through the outer cowl connecting flange opening 106 so that the outer connector shoulder 138 engages with an outer side 154 of the outer dome connecting flange 55. An outer connector retention member 156 (e.g., a nut) threadedly engages with the external threads 132 of the second end 136 of the outer connector shank 130 so that the outer connector retention member 156 engages with an inner side 158 of the outer cowl connecting flange 104. The outer dome connecting flange 55 and the outer cowl connecting flange 104 are, therefore, sandwiched between the outer connector shoulder 138 and the outer connector retention member 156, and torque can be applied to the torque cavity 140 to tighten the connection between the outer connecting member 126 and the outer connector retention member 156.

Figure 5:
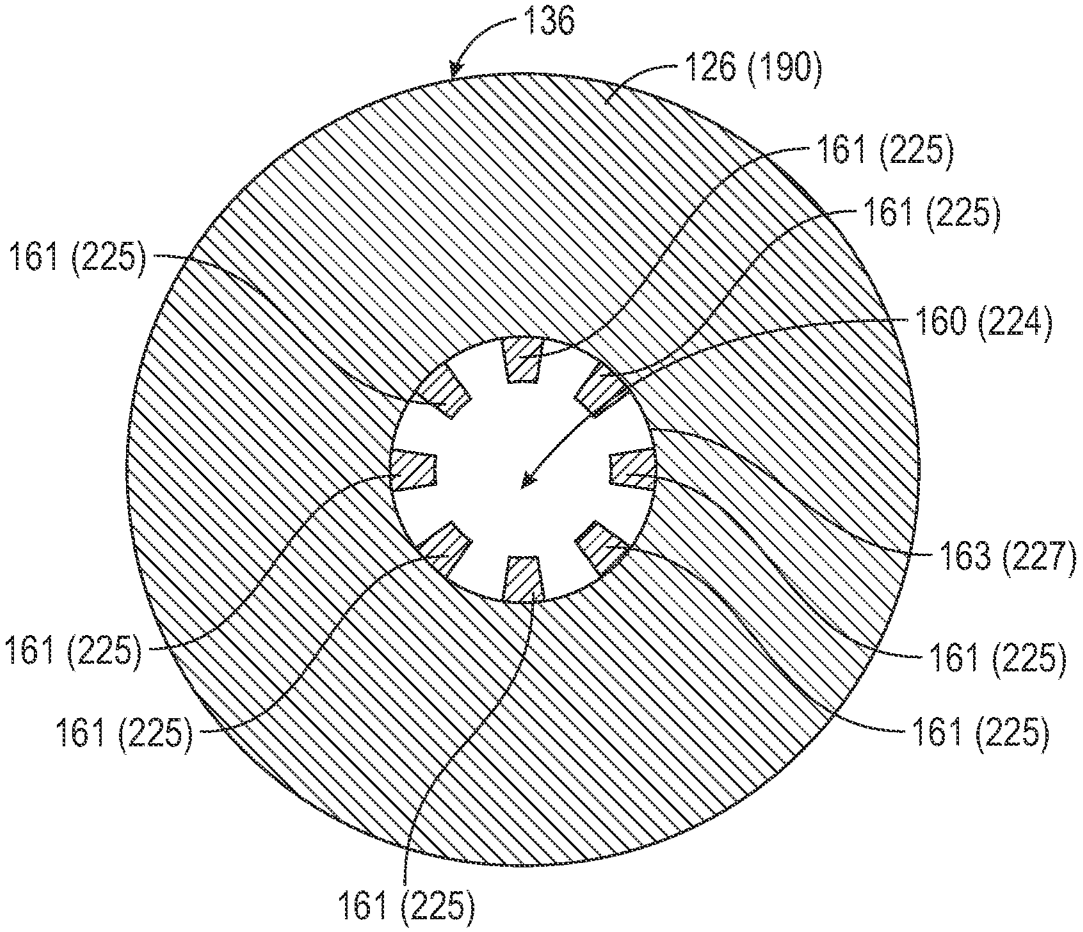
FIG. 5 is an enlarged cross-sectional view of an outer connecting member, taken at plane 5-5 of FIG. 3, according to an aspect of the present disclosure.

The outer connecting member 126 may further include a thermal activation opening 160 that extends through the outer connector shank 130 and through the outer connector head 128 to provide a flow of the compressed air 83 therethrough from the pressure plenum 66 into the outer flow passage 88. FIG. 5 is an enlarged cross-sectional view of the outer connecting member 126, taken at plane 5-5 of FIG. 3, according to an aspect of the present disclosure. In FIG. 5, a cross section through the outer connector retention member 156 (FIG. 3) is omitted. In FIG. 5, the thermal activation opening 160 is seen to include a plurality of thermal activation opening projections 161 that extend from an inner wall 163 defining the thermal activation opening 160. The thermal activation opening projections 161 may be, for example, splines that extend axially along a length of the thermal activation opening 160. Alternatively, the thermal activation opening projections 161 may be a plurality of individual projections dispersed about the inner wall 163, and dispersed axially along the length of the inner wall 163. The thermal activation opening projections 161 increase the surface area within the thermal activation opening 160 so as to provide additional thermal response to the outer connecting member 126. As described above with regard to FIG. 2, the compressed air 82 from the plenum 84 enters the pressure plenum 66 within the cowl structure 60 as the compressed air 83, and another portion of the compressed air 82 flows into the outer flow passage 88. A pressure difference between the pressure plenum 66 and the outer flow passage 88 provides the flow of the compressed air 83 through the thermal activation opening 160. Thus, the flow of the compressed air 83 through the thermal activation opening 160 and along the thermal activation opening projections 161 acts to reduce the time required to cool or heat the outer connecting member 126 so as to reduce the thermal lag of the outer connecting member 126 (e.g., the bushing bolt) in expanding and contracting due to temperature changes within the combustor 29 as compared to the rate of expansion and contraction of the components that are being bolted together by the bushing bolt, without a significant impact on the overall combustor airflow. Further, the inclusion of the thermal activation opening 160 and the torque cavity 140 (FIG. 3) reduces the weight of the outer connecting member 126, thereby reducing the overall weight of the combustion section 26 (FIG. 2), considering that a relatively large number of the outer connecting members 126 (e.g., over one-hundred of the outer connecting members 126) are implemented within the combustion section 26.

The outer connection 92 arrangement of the FIG. 3 aspect provides for a tight connection between the outer dome connecting flange 55 and the outer cowl connecting flange 104, while permitting radial movement of the outer liner connecting flange 108 of the CMC outer liner 54 due to the sliding engagement between the outer surface 142 of the outer connector head 128 and the inner surface 124 of the outer liner connecting flange bushing 114. In addition, the implementation of the outer connecting member 126 as a bushing bolt provides for a lower radial profile of the outer connection 92 extending into the outer flow passage 88, thereby reducing an interruption of the flow of the compressed air 85 into the outer flow passage 88 since the head of the bushing bolt has a lower projection into the outer flow passage 88 as compared to a conventional bolt head.

Figure 6:
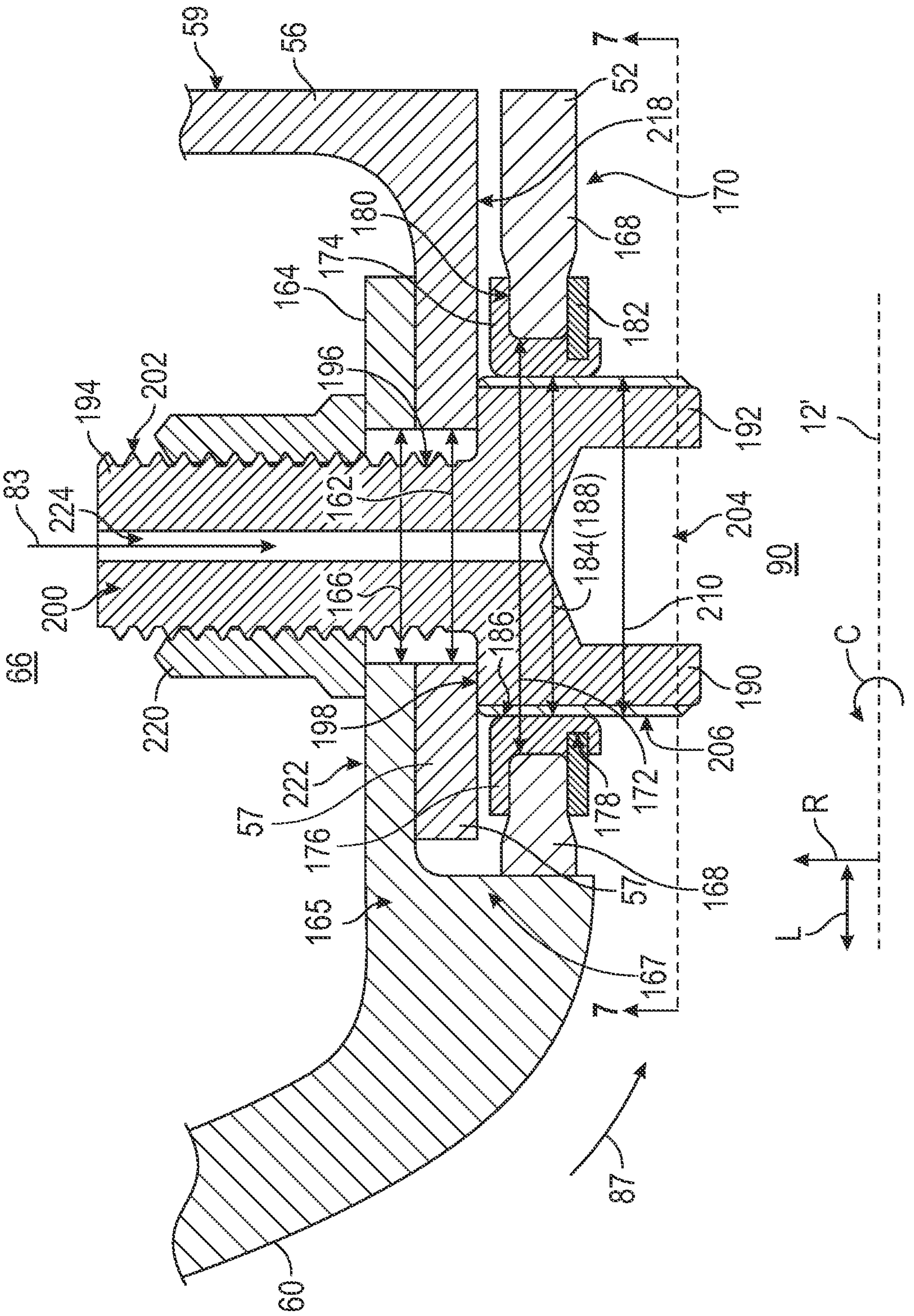
FIG. 6 is an enlarged partial cross-sectional view of an inner connection, taken at detail view 100 of FIG. 2, according to an aspect of the present disclosure.

FIG. 6 is an enlarged partial cross-sectional view of the inner connection 94, taken at detail view 100 of FIG. 2, according to an aspect of the present disclosure. The inner connection 94 of the FIG. 6 aspect is similar to the outer connection 92 of the FIG. 3 aspect. As was briefly described above, the inner connection 94 connects the CMC inner liner 52, the cowl structure 60, and the dome structure 56 to each other. In the inner connection 94, the dome structure 56 includes the inner dome connecting flange 57 that is connected to the dome plate 59. The inner dome connecting flange 57 extends in a longitudinal direction L with respect to the combustor centerline axis 12'. The inner dome connecting flange 57 includes an inner dome connecting flange opening 162 therethrough. In the FIG. 6 aspect, the dome structure 56, and, thus, the inner dome connecting flange 57, may be constructed of a metallic material.

The cowl structure 60 includes an inner cowl connecting flange 164 that extends in the longitudinal direction L with respect to the combustor centerline axis 12' from an outer side 165 of an outer cowl connecting flange root portion 167. The cowl structure 60 is a single flange (or single yoke) cowl structure in that, the inner cowl connecting flange 164 is not part of a dual flange (or clevis-type) of connecting flange arrangement for connecting the cowl structure 60 with the CMC inner liner 52 and with the dome structure 56. The inner cowl connecting flange 164 includes an inner cowl connecting flange opening 166 therethrough. In the FIG. 6 aspect, the cowl structure 60, and, thus, the inner cowl connecting flange 164, may be constructed of a metallic material.

The CMC inner liner 52 includes an inner liner connecting flange 168 that extends in the longitudinal direction L from an upstream end 170 of the CMC inner liner 52. The inner liner connecting flange 168 includes an inner liner connecting flange opening 172 therethrough. An inner liner connecting flange bushing 174 is arranged within the inner liner connecting flange opening 172. The inner liner connecting flange bushing 174 includes a flange 176 on a first side of the inner liner connecting flange bushing 174, and a retention ring groove 178 on a second side of the inner liner connecting flange bushing 174. When the inner liner connecting flange bushing 174 is installed within the inner liner connecting flange opening 172, the flange 176 engages with an outer side 180 of the inner liner connecting flange 168, and a retention ring 182 is installed in the retention ring groove 178 to connect the inner liner connecting flange bushing 174 to the inner liner connecting flange 168. The inner liner connecting flange bushing 174 includes an inner liner connecting flange bushing opening 184 therethrough that has an inner surface 186 extending about a circumference of the inner liner connecting flange bushing opening 184. The inner surface 186 has an inner diameter 188.

The inner connection 94 further includes an inner connecting member 190 (e.g., a bushing bolt) that has an inner connector head 192 and an inner connector shank 194. The inner connecting member 190 may be the same as the outer connecting member 126. The inner connector head 192 is arranged at a first end 196 of the inner connector shank 194 and includes an inner connector shoulder 198. At least a portion of a second end 200 of the inner connector shank 194 may have external threads 202. The inner connector head 192 includes a torque cavity 204 arranged within the inner connector head 192, and an outer surface 206, which may be a wear coating applied to the inner connector head 192. The wear coating may be, for example, a cobalt-molybdenum-chromium superalloy (such as Tribaloy® T-400®, T-800®, etc.).

Figure 7D:
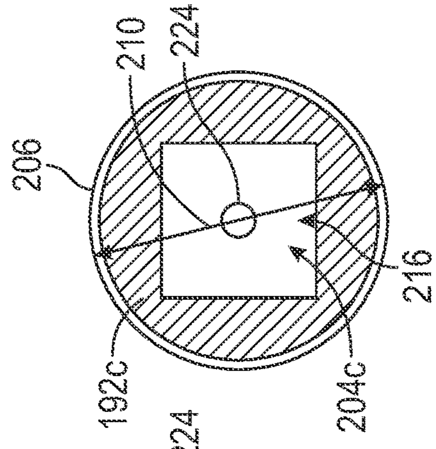
FIG. 7D depicts an alternate outer connector head to that shown in FIG. 7A, according to an aspect of the present disclosure.
Figure 7C:
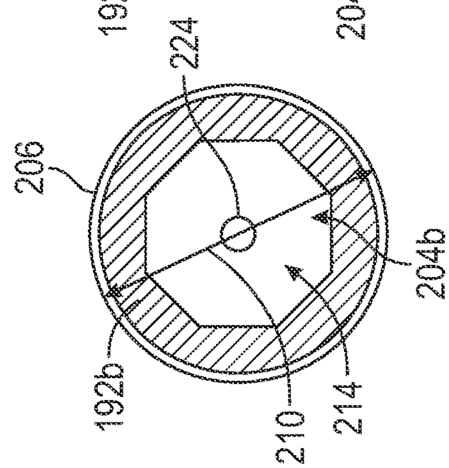
FIG. 7C depicts an alternate outer connector head to that shown in FIG. 7A, according to an aspect of the present disclosure.
Figure 7B:
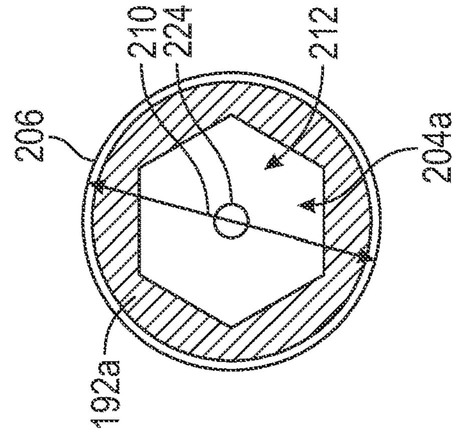
FIG. 7B depicts an alternate outer connector head to that shown in FIG. 7A, according to an aspect of the present disclosure.
Figure 7A:
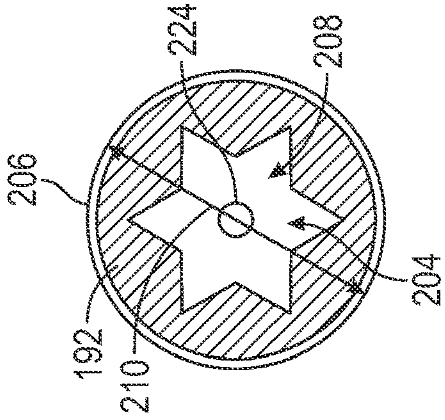
FIG. 7A is a cross-sectional view of the outer connector head, taken at plane 7-7 of FIG. 6, according to an aspect of the present disclosure.

FIG. 7A is a cross-sectional view of the inner connector head 192, taken at plane 7-7 of FIG. 6, according to an aspect of the present disclosure. In FIG. 7A, the torque cavity 204 is a star-shaped cavity 208. The star-shaped cavity 208 provides the ability to apply torque to the inner connecting member 190 (FIG. 6). In addition, the inner connector head 192 has an outer diameter 210 of the outer surface 206. The outer diameter 210 of the inner connector head 192 is machined so as to be less than the inner diameter 188 (FIG. 6) of the inner surface 186 (FIG. 6) of the inner liner connecting flange bushing opening 184 (FIG. 6) so as to allow a sliding engagement between the outer surface 206 and the inner surface 186 of the inner liner connecting flange bushing opening 184.

FIG. 7B depicts an alternate inner connector head 192*a* to that shown in FIG. 7A, according to an aspect of the present disclosure. Elements in FIG. 7B that are the same as those in FIG. 7A are labeled with the same reference numerals. In FIG. 7B, an alternate torque cavity 204*a* of the inner connector head 192*a* includes a hexagon-shaped cavity 212. The hexagon-shaped cavity 212 provides the ability to apply torque to the inner connecting member 190 (FIG. 6).

FIG. 7C depicts an alternate inner connector head 192*b* to that shown in FIG. 7A, according to an aspect of the present disclosure. Elements in FIG. 7C that are the same as those in FIG. 7A are labeled with the same reference numerals. In FIG. 7C, an alternate torque cavity 204*b* of the inner connector head 192*b* includes an octagon-shaped cavity 214. The octagon-shaped cavity 214 provides the ability to apply torque to the inner connecting member 190 (FIG. 6).

FIG. 7D depicts an alternate inner connector head 192*c* to that shown in FIG. 7A, according to an aspect of the present disclosure. Elements in FIG. 7D that are the same as those in FIG. 7A are labeled with the same reference numerals. In FIG. 7D, an alternate torque cavity 204*c* of the inner connector head 192*c* includes a square-shaped cavity 216. The square-shaped cavity 216 provides the ability to apply torque to the inner connecting member 190 (FIG. 6). FIG. 7A to FIG. 7D provide examples of cavity shapes that may be implemented in the inner connector head 192, but other shaped cavities can be implemented instead, as long as the shape provides the ability to apply torque to the inner connecting member 190.

Returning to FIG. 6, in connecting the inner connection 94, the inner connecting member 190 is inserted to extend through the inner liner connecting flange bushing 174, through the inner dome connecting flange opening 162, and through the inner cowl connecting flange opening 166 so that the inner connector shoulder 198 engages with an inner side 218 of the inner dome connecting flange 57. An inner connector retention member 220 (e.g., a nut) threadedly engages with the external threads 202 of the second end 200 of the inner connector shank 194 so that the inner connector retention member 220 engages with an outer side 222 of the inner cowl connecting flange 164. The inner dome connecting flange 57 and the inner cowl connecting flange 164 are, therefore, sandwiched between the inner connector shoulder 198 and the inner connector retention member 220, and torque can be applied to the torque cavity 204 to tighten the connection between the inner connecting member 190 and the inner connector retention member 220.

The inner connecting member 190 may further include a thermal activation opening 224 that extends through the inner connector shank 194 and through the inner connector head 192 to provide a flow of the compressed air 83 therethrough from the pressure plenum 66 into the inner flow passage 90. As stated above, the inner connecting member 190 may be the same as the outer connecting member 126 (FIG. 3). Thus, referring back to FIG. 5, the thermal activation opening 224 of the inner connecting member 190 may be the same as the thermal activation opening 160 of the outer connecting member 126. The thermal activation opening 224 includes thermal activation opening projections 225 extending from an inner wall 227 of the thermal activation opening 224, which may be the same as the thermal activation opening projections 161. A pressure difference between the pressure plenum 66 and the inner flow passage 90 provides the flow of the compressed air 83 through the thermal activation opening 224. Thus, the thermal activation can provide cooling to the inner connecting member 190 (e.g., the bushing bolt) so as to better retain the sliding engagement of the inner connector head 192 and the inner liner connecting flange bushing 174, without a significant impact on the overall combustor airflow. Further, the inclusion of the thermal activation opening 224 and the torque cavity 204 (FIG. 6) reduces the weight of the inner connecting member 190, thereby reducing the overall weight of the combustion section 26 (FIG. 2), considering that a relatively large number (e.g., over one-hundred inner connecting members 190) of the inner connecting members 190 are implemented within the combustion section 26.

The inner connection 94 arrangement of the FIG. 6 aspect provides for a tight connection between the inner dome connecting flange 57 and the inner cowl connecting flange 164, while permitting radial movement of the inner liner connecting flange 168 of the CMC inner liner 52 due to the sliding engagement between the outer surface 206 of the inner connector head 192 and the inner surface 186 of the inner liner connecting flange bushing 174. In addition, the implementation of the inner connecting member 190 as a bushing bolt provides for a lower radial profile of the inner connection 94 extending into the inner flow passage 90, thereby reducing an interruption of the flow of the compressed air 87 into the inner flow passage 90 since the head of the bushing bolt has a lower projection into the inner flow passage 90 as compared with a conventional bolt head.

Figure 8:
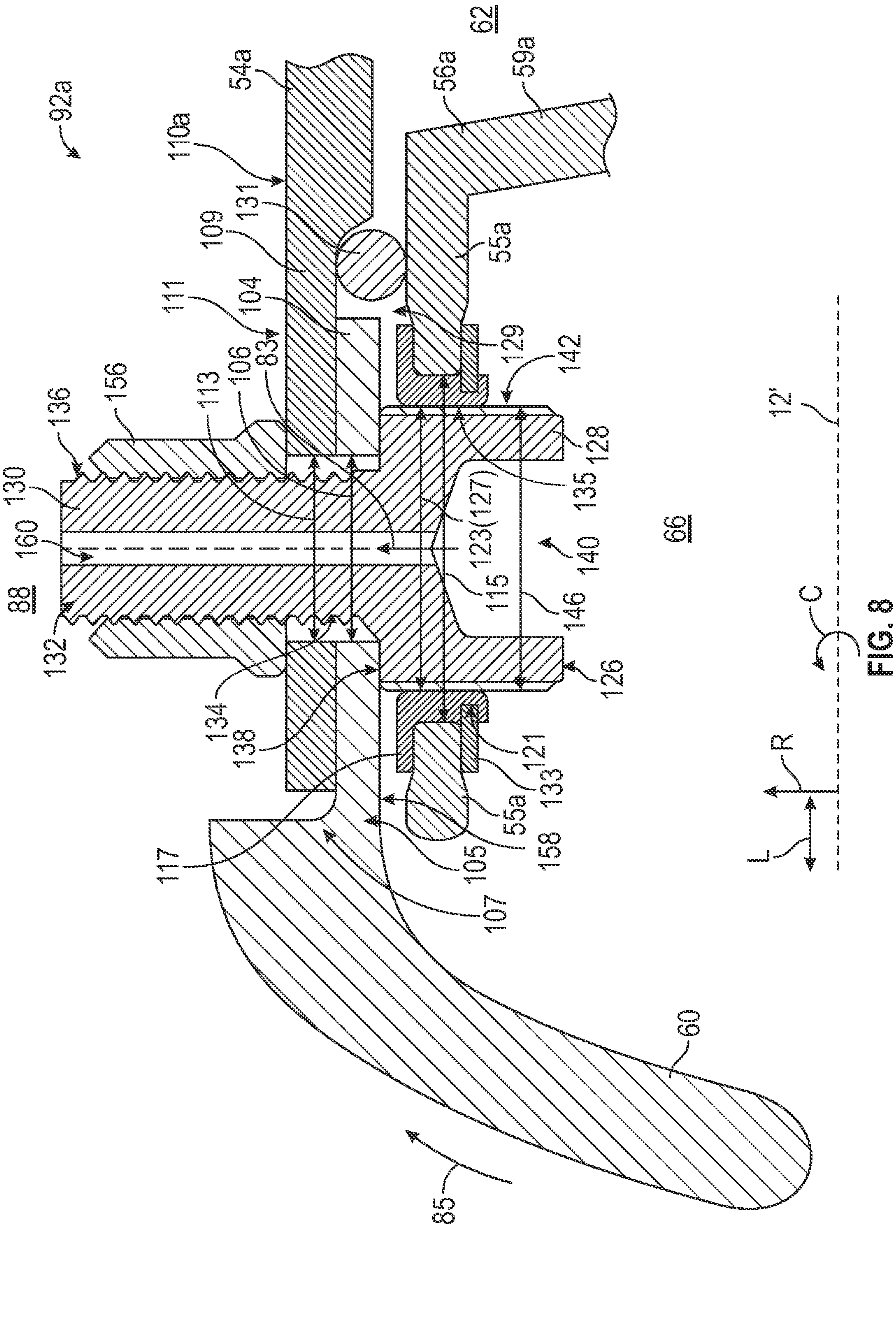
FIG. 8 depicts an arrangement of an alternate outer connection to that shown in FIG. 3, according to an aspect of the present disclosure.

FIG. 8 depicts an arrangement of an alternate outer connection 92*a* to that shown in FIG. 3, according to an aspect of the present disclosure. In the FIG. 8 aspect, elements that are same as those of the FIG. 3 aspect include the same reference numerals and the description of those elements provided above for the FIG. 3 aspect is applicable to the same elements in the FIG. 8 aspect. The FIG. 8 aspect includes a metallic (or a non-CMC) outer liner 54*a* that includes an outer liner connecting flange 109 extending in the longitudinal direction L from an upstream end 110*a* of the metallic outer liner 54*a*, and having an outer liner connecting flange opening 113 therethrough. The alternate outer connection 92*a* includes a CMC dome structure 56*a* that includes a CMC outer dome connecting flange 55*a* extending in the longitudinal direction L from a CMC dome plate 59*a*. The CMC outer dome connecting flange 55*a* has an outer dome connecting flange opening 115 therethrough. An outer dome connecting flange bushing 117 is installed in the outer dome connecting flange opening 115. The outer dome connecting flange bushing 117 is similar to the outer liner connecting flange bushing 114 of the FIG. 3 aspect, and includes a retention ring groove 121. A retention ring 133 is installed in the retention ring groove 121 to retain the outer dome connecting flange bushing 117 within the outer dome connecting flange opening 115. The outer dome connecting flange bushing 117 has an outer dome connecting flange bushing opening 123 therethrough that has an inner surface 135 having an inner diameter 127. The inner diameter 127 is slightly greater than the outer diameter 146 of the outer connector head 128 of the outer connecting member 126 so that the inner surface 135 of the outer dome connecting flange bushing opening 123 slidingly engages with the outer surface 142 of the outer connector head 128. An outer seal cavity 129 is formed between the outer liner connecting flange 109 and the CMC outer dome connecting flange 55*a*, and an outer seal member 131 may be installed within the outer seal cavity 129.

The outer connecting member 126 is also implemented in the FIG. 8 aspect. However, in the FIG. 8 aspect, the outer connecting member 126 is installed in reverse to that of the FIG. 3 aspect. More specifically, in forming the alternate outer connection 92*a*, the outer connector shank 130 of the outer connecting member 126 is installed through the outer dome connecting flange bushing opening 123, through the outer cowl connecting flange opening 106, and through the outer liner connecting flange opening 113 until the outer connector shoulder 138 engages with the inner side 158 of the outer cowl connecting flange 104. The outer connector retention member 156 is threadedly engaged with the external threads 132 of the outer connecting member 126, and the outer connector retention member 156 is torqued to engage an outer side 111 of the outer liner connecting flange 109. Thus, the alternate outer connection 92*a* provides for connecting the metallic outer liner 54*a* to the metallic outer cowl connecting flange 104, and for connecting the CMC outer dome connecting flange 55*a* to the outer connecting member 126.

Figure 9:
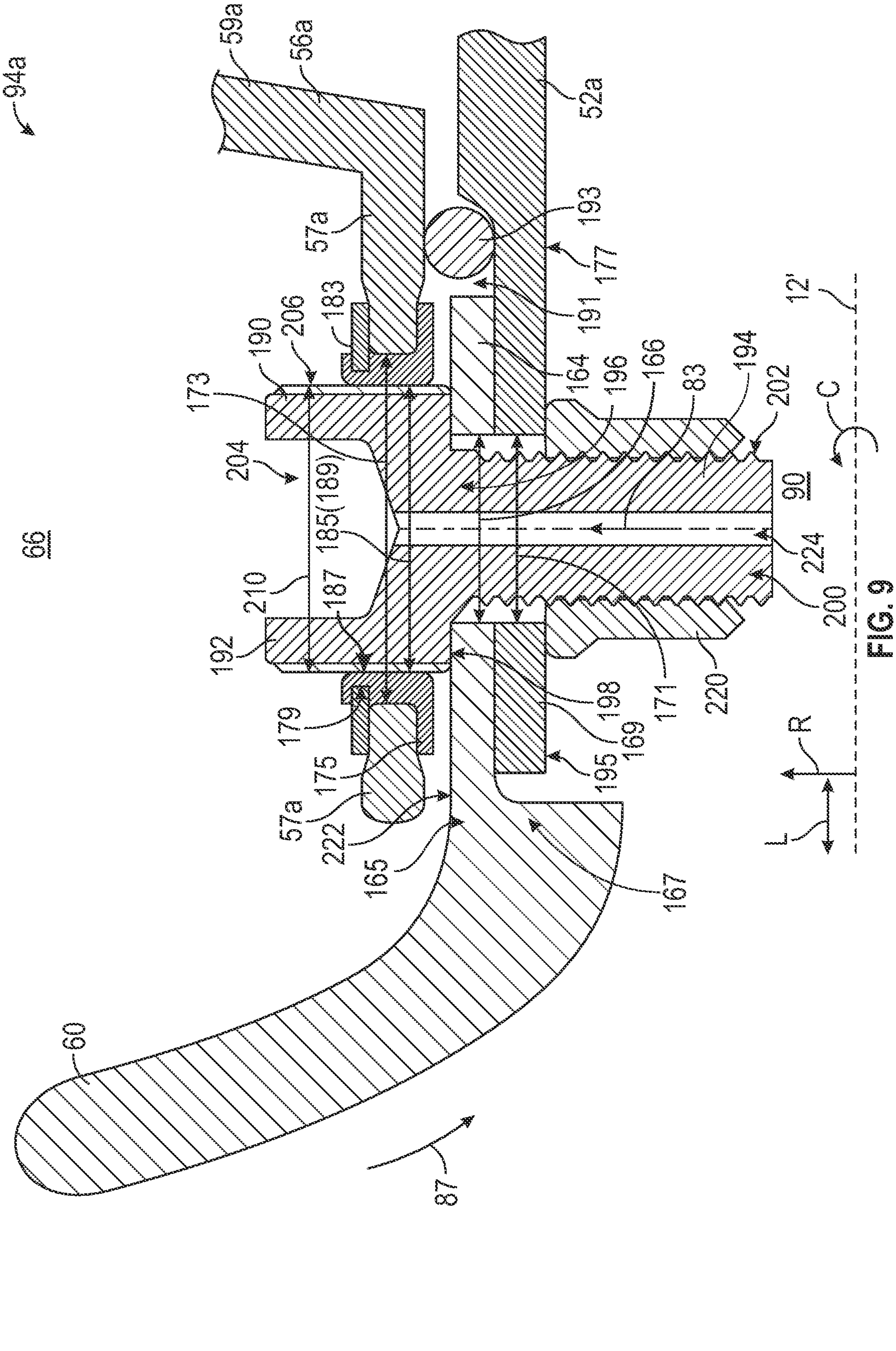
FIG. 9 depicts an arrangement of an alternate inner connection to that shown in FIG. 6, according to an aspect of the present disclosure.

FIG. 9 depicts an arrangement of an alternate inner connection 94*a* to that shown in FIG. 6, according to an aspect of the present disclosure. In the FIG. 9 aspect, elements that are same as those of the FIG. 6 aspect include the same reference numerals and the description of those elements provided above for the FIG. 6 aspect is applicable to the same elements in the FIG. 9 aspect. The FIG. 9 aspect includes a metallic (or a non-CMC) inner liner 52*a* that includes an inner liner connecting flange 169 extending in the longitudinal direction from an upstream end 177 of the metallic inner liner 52*a* and having an inner liner connecting flange opening 171 therethrough. The alternate inner connection 94*a* includes the CMC dome structure 56*a* that includes a CMC inner dome connecting flange 57*a* extending in the longitudinal direction L from the CMC dome plate 59*a*. The CMC inner dome connecting flange 57*a* has an inner dome connecting flange opening 173 therethrough. An inner dome connecting flange bushing 175 is installed in the inner dome connecting flange opening 173. The inner dome connecting flange bushing 175 is similar to the inner liner connecting flange bushing 174 of the FIG. 6 aspect, and includes a retention ring groove 179. A retention ring 183 is installed in the retention ring groove 179 to retain the inner dome connecting flange bushing 175 within the inner dome connecting flange opening 173. The inner dome connecting flange bushing 175 has an inner dome connecting flange bushing opening 185 therethrough that has an inner surface 187 having an inner diameter 189. The inner diameter 189 is slightly greater than the outer diameter 210 of the inner connector head 192 of the inner connecting member 190 so that the inner dome connecting flange bushing 175 slidingly engages with the outer surface 206 of the inner connector head 192. An inner seal cavity 191 is formed between the inner liner connecting flange 169 and the CMC inner dome connecting flange 57*a*, and an inner seal member 193 may be installed within the inner seal cavity 191.

The inner connecting member 190 is also implemented in the FIG. 9 aspect. However, in the FIG. 9 aspect, the inner connecting member 190 is installed in reverse to that of the FIG. 6 aspect. More specifically, in forming the alternate inner connection 94*a*, the inner connector shank 194 of the inner connecting member 190 is installed through the inner dome connecting flange bushing opening 185, through the inner cowl connecting flange opening 166, and through the inner liner connecting flange opening 171 until the inner connector shoulder 198 engages with the outer side 222 of the inner cowl connecting flange 164. The inner connector retention member 220 is threadedly engaged with the external threads 202 of the inner connecting member 190, and the inner connector retention member 220 is torqued to engage an inner side 195 of the inner liner connecting flange 169. Thus, the alternate inner connection 94*a* provides for connecting the metallic inner liner 52*a* to the metallic inner cowl connecting flange 164, and for connecting the CMC inner dome connecting flange 57*a* to the inner connecting member 190.

Figure 10:
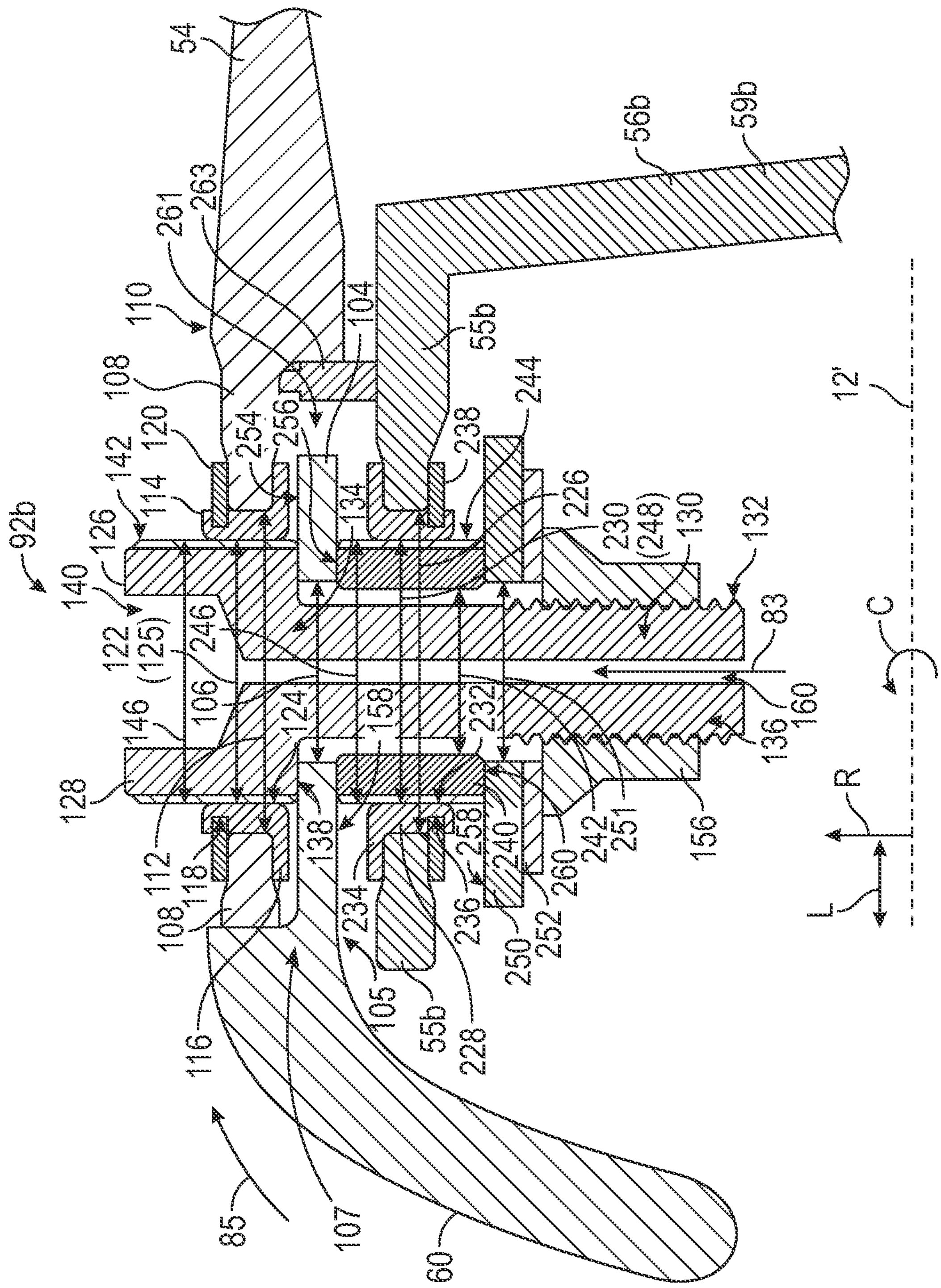
FIG. 10 depicts an alternate arrangement of an outer connection to that shown in FIG. 3, according to an aspect of the present disclosure.

FIG. 10 depicts an alternate arrangement of an outer connection 92*b* to that shown in FIG. 3, according to an aspect of the present disclosure. In the FIG. 10 aspect, elements that are same as those of the FIG. 3 aspect include the same reference numerals and the description of those elements provided above for the FIG. 3 aspect is applicable to the same elements in the FIG. 10 aspect. One difference between the FIG. 10 aspect and the FIG. 3 aspect is that, in the FIG. 10 aspect, the dome structure 56 (FIG. 3) is a CMC dome structure 56*b* and the alternate outer connection 92*b* includes various additional components for connecting the CMC dome structure 56*b*. In FIG. 10, the CMC dome structure 56*b* includes a CMC outer dome connecting flange 55*b* that is connected to a CMC dome plate 59*b*. The CMC outer dome connecting flange 55*b* extends in a longitudinal direction L with respect to the combustor centerline axis 12'. The CMC outer dome connecting flange 55*b* includes an outer dome connecting flange opening 226 therethrough. An outer dome connecting flange bushing 228 is installed within the outer dome connecting flange opening 226. The outer dome connecting flange bushing 228 has an outer dome connecting flange bushing opening 230 therethrough that has an inner surface 232 having an inner diameter 248. The outer dome connecting flange bushing 228 includes a flange 234 on a first side of the outer dome connecting flange bushing 228 and a retention ring groove 236 on a second side of the outer dome connecting flange bushing 228. A retention ring 238 is installed within the retention ring groove 236 to retain the outer dome connecting flange bushing 228 within the outer dome connecting flange opening 226.

The alternate outer connection 92*b* further includes an outer dome connector bushing 240 that has an outer dome connector bushing opening 242 therethrough, and an outer diameter 246 that defines an outer surface 244 that may include a wear coating. The outer diameter 246 of the outer surface 244 of the outer dome connector bushing 240, and the inner diameter 248 of the inner surface 232 of the outer dome connecting flange bushing 228 are machined (e.g., ground or burnished) such that the outer diameter 246 is slightly less than the inner diameter 248 so that the outer dome connecting flange bushing 228 slidingly engages with the outer diameter 246 of the outer dome connector bushing 240. The alternate outer connection 92*b* may further include a radial stop washer 250 that has a radial stop washer opening 251 therethrough, and a washer 252.

In forming the alternate outer connection 92*b*, the outer connector shank 130 of the outer connecting member 126 is inserted through the outer liner connecting flange bushing opening 122 of the outer liner connecting flange bushing 114 so that the outer connector shoulder 138 engages with an outer side 254 of the outer cowl connecting flange 104. The outer dome connector bushing 240 is installed so that the outer connector shank 130 of the outer connecting member 126 extends through the outer dome connector bushing opening 242 so that an outer side 256 of the outer dome connector bushing 240 engages with the inner side 158 of the outer cowl connecting flange 104. The CMC dome structure 56*b*, with the outer dome connecting flange bushing 228 being installed on the CMC outer dome connecting flange 55*b*, is then installed by installing the outer dome connecting flange bushing 228 into the outer dome connector bushing 240 so that the outer surface 244 of the outer dome connector bushing 240 and the inner surface 232 of the outer dome connecting flange bushing 228 slidingly engage with one another. An outer seal cavity 261 is defined between the outer liner connecting flange 108 and the CMC outer dome connecting flange 55*b*, and an outer seal member 263 is installed within the outer seal cavity 261 to seal-off airflow between the CMC outer liner 54 and the CMC dome structure 56*b*. The radial stop washer 250 is installed so that the outer connector shank 130 extends through the radial stop washer opening 251 and so that an outer side 258 of the radial stop washer 250 engages with an inner side 260 of the outer dome connector bushing 240. The washer 252, which is optional and need not be implemented, is installed over the outer connector shank 130 and the outer connector retention member 156 (e.g., a nut) is threadedly engaged to the external threads 132 of the outer connector shank 130, and torque is applied to the torque cavity 140 to tighten the outer connecting member 126.

The alternate outer connection 92*b* of the FIG. 10 aspect provides the ability for the CMC outer liner 54 to move radially due to the sliding engagement between the outer surface 142 of the outer connector head 128 and the inner surface 124 of the outer liner connecting flange bushing opening 122. In addition, the CMC dome structure 56*b* is also able to move radially due to the sliding engagement between the outer surface 244 of the outer dome connector bushing 240 and the inner surface 232 of the outer dome connecting flange bushing 228. The inner side 158 of the outer cowl connecting flange 104 functions as a radial stop to limit the amount of radial outward movement of the CMC dome structure 56*b*, and the radial stop washer 250 functions as a radial stop to limit the amount of radial inward movement of the CMC dome structure 56*b*.

Figure 11:
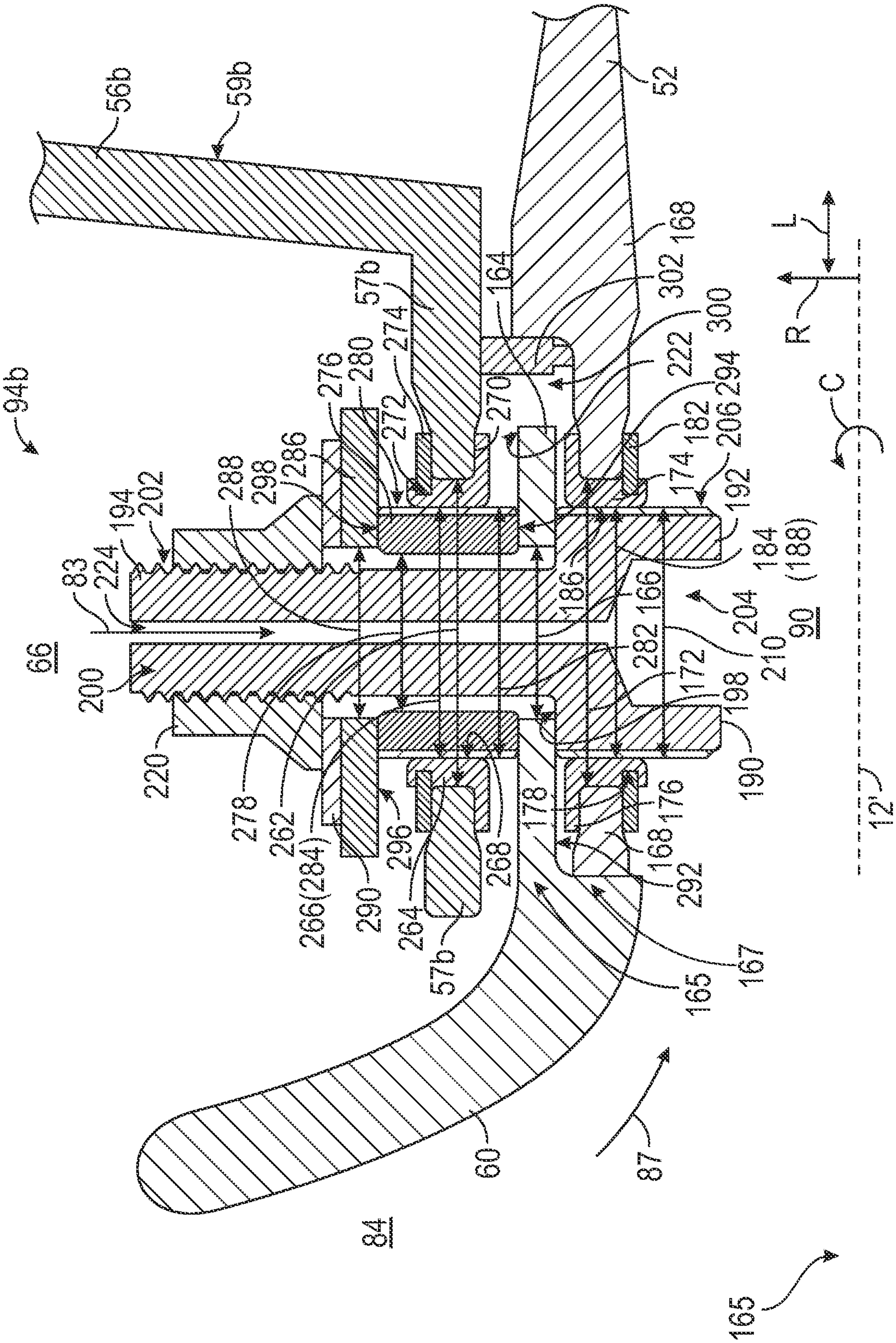
FIG. 11 depicts an alternate arrangement of an inner connection to that shown in FIG. 6, according to an aspect of the present disclosure.

FIG. 11 depicts an alternate arrangement of an inner connection 94*b* to that shown in FIG. 6, according to an aspect of the present disclosure. In the FIG. 11 aspect, elements that are same as those of the FIG. 6 aspect include the same reference numerals and the description of those elements provided above for the FIG. 6 aspect is applicable to the same elements in the FIG. 11 aspect. The FIG. 11 aspect is similar to the FIG. 10 aspect in that the FIG. 11 aspect includes the CMC dome structure 56*b*, and the alternate inner connection 94*b* is similar to the alternate outer connection 92*b*. In FIG. 11, the CMC dome structure 56*b* includes a CMC inner dome connecting flange 57*b* that is connected to the CMC dome plate 59*b*. The CMC inner dome connecting flange 57*b* extends in the longitudinal direction L with respect to the combustor centerline axis 12'. The CMC inner dome connecting flange 57*b* includes an inner dome connecting flange opening 262 therethrough. An inner dome connecting flange bushing 264 is installed within the inner dome connecting flange opening 262. The inner dome connecting flange bushing 264 has an inner dome connecting flange bushing opening 266 therethrough that has an inner surface 268 having an inner diameter 284. The inner dome connecting flange bushing 264 includes a flange 270 on a first side of the inner dome connecting flange bushing 264 and a retention ring groove 272 on a second side of the inner dome connecting flange bushing 264. A retention ring 274 is installed within the retention ring groove 272 to retain the inner dome connecting flange bushing 264 within the inner dome connecting flange bushing opening 266.

The alternate inner connection 94*b* further includes an inner dome connector bushing 276 that has an inner dome connector bushing opening 278 therethrough, and an outer diameter 282 that defines an outer surface 280 that may have a wear coating. The outer diameter 282 of the outer surface 280 of the inner dome connector bushing 276, and the inner diameter 284 of the inner surface 268 of the inner dome connecting flange bushing 264 are machined (e.g., ground or burnished) such that the outer diameter 282 is slightly less than the inner diameter 284 so that the inner dome connector bushing 276 slidingly engages with the outer diameter 282 of the inner dome connector bushing 276. The alternate inner connection 94*b* may further include a radial stop washer 286 that has a radial stop washer opening 288 therethrough, and a washer 290.

In forming the alternate inner connection 94*b*, the inner connector shank 194 of the inner connecting member 190 is inserted through the inner liner connecting flange bushing opening 184 of the inner liner connecting flange bushing 174 so that the inner connector shoulder 198 engages with an inner side 292 of the inner cowl connecting flange 164. The inner dome connector bushing 276 is installed so that the inner connector shank 194 of the inner connecting member 190 extends through the inner dome connector bushing opening 278 so that an inner side 294 of the inner dome connector bushing 276 engages with the outer side 222 of the inner cowl connecting flange 164. The CMC dome structure 56*b*, with the inner dome connecting flange bushing 264 being installed on the CMC inner dome connecting flange 57*b*, is then installed by installing the inner dome connecting flange bushing 264 onto the inner dome connector bushing 276 so that the outer surface 280 of the inner dome connector bushing 276 and the inner surface 268 of the inner dome connecting flange bushing 264 slidingly engage with one another. An inner seal cavity 300 is defined between the inner liner connecting flange 168 and the CMC inner dome connecting flange 57*b*, and an inner seal member 302 is installed within the inner seal cavity 300 to seal-off airflow between the CMC inner liner 52 and the CMC dome structure 56*b*. The radial stop washer 286 is then installed so that the inner connector shank 194 extends through the radial stop washer opening 288 and so that an inner side 296 of the radial stop washer 250 engages with an outer side 298 of the inner dome connector bushing 276. The washer 290, which is optional and need not be implemented, is installed over the inner connector shank 194 and the inner connector retention member 220 (e.g., a nut) is threadedly engaged to the external threads 202 of the inner connector shank 194 and torque is applied to the torque cavity 204 to tighten inner connecting member 190.

The alternate inner connection 94*b* of the FIG. 11 aspect provides the ability for the CMC inner liner 52 to move radially due to the sliding engagement between the outer surface 206 of the inner connector head 192 and the inner surface 186 of the inner liner connecting flange bushing opening 184. In addition, the CMC dome structure 56*b* is also able to move radially due to the sliding engagement between the outer surface 280 of the inner dome connector bushing 276 and the inner surface 268 of the inner dome connecting flange bushing 264. The outer side 222 of the inner cowl connecting flange 164 functions as a radial stop to limit the amount of radial inward movement of the CMC dome structure 56*b*, and the radial stop washer 286 functions as a radial stop to limit the amount of radial outward movement of the CMC dome structure 56*b*.

Figure 12:
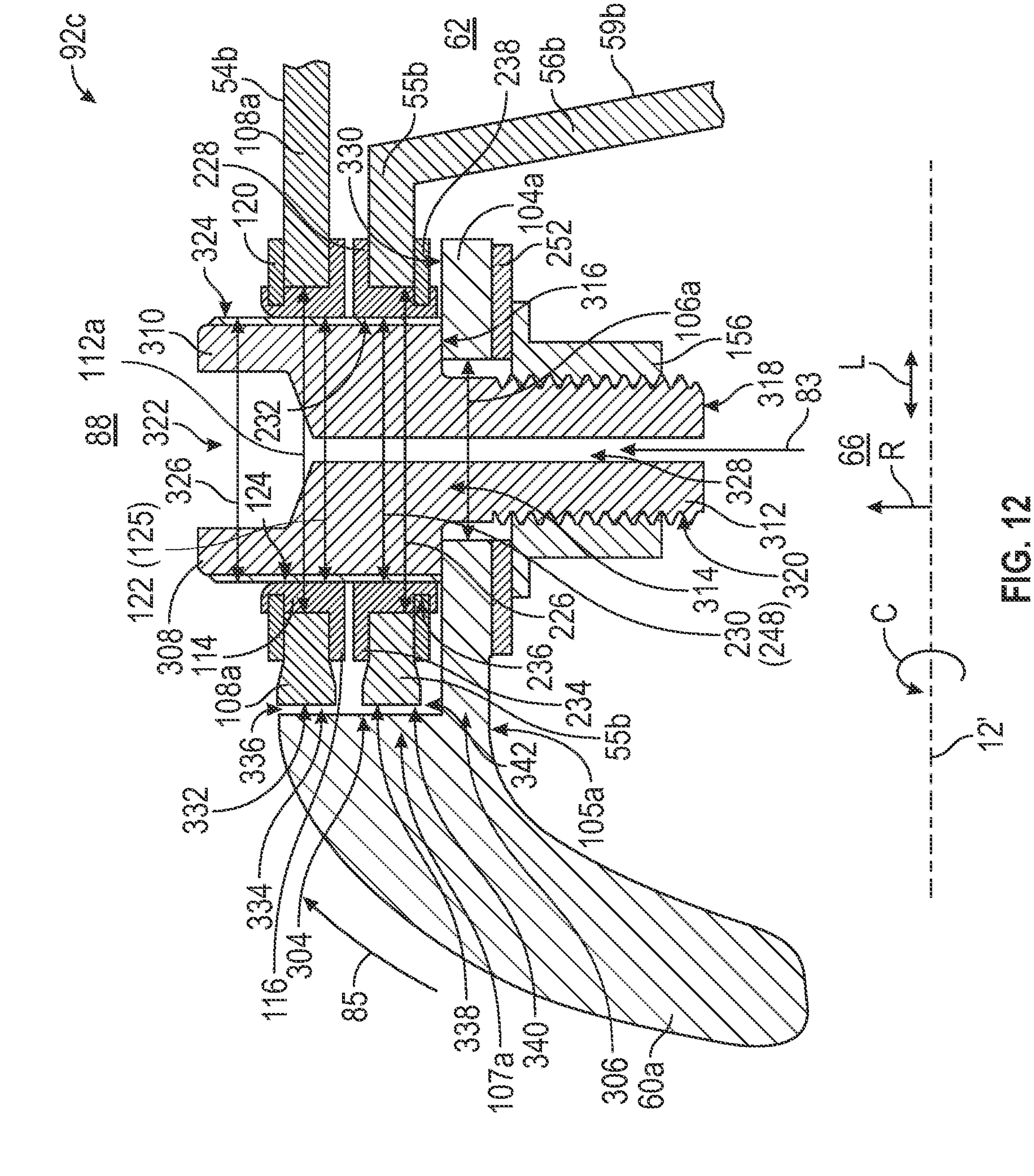
FIG. 12 depicts an alternate arrangement of an outer connection to that shown in FIG. 10, according to an aspect of the present disclosure.

FIG. 12 depicts an alternate arrangement of an outer connection 92*c* to that shown in FIG. 10, according to an aspect of the present disclosure. In the FIG. 12 aspect, elements that are same as those of the FIG. 10 aspect include the same reference numerals and the description of those elements provided above for the FIG. 10 aspect is applicable to the same elements in the FIG. 12 aspect. The FIG. 12 aspect includes an alternate cowl structure 60*a* that includes an outer cowl connecting flange 104*a* that extends in the longitudinal direction L with respect to the combustor centerline axis 12' from an inner side 105*a* of an outer cowl connecting flange root portion 107*a* of the alternate cowl structure 60*a*. Similar to the FIG. 10 aspect, the cowl structure 60*a* is a single flange (or single yoke) cowl structure in that, the outer cowl connecting flange 104*a* is not part of a dual flange (or clevis-type) connecting flange arrangement for connecting the alternate cowl structure 60*a* with a CMC outer liner 54*b* and with the CMC dome structure 56*b*. The outer cowl connecting flange 104*a* includes an outer cowl connecting flange opening 106*a* therethrough. One difference between the cowl structure 60 of the FIG. 10 aspect and the alternate cowl structure 60*a* of the FIG. 12 aspect is that the outer cowl connecting flange root portion 107*a* includes an outer discourager wall 304 that extends radially outward from an upstream end 306 of the outer cowl connecting flange 104*a*. The outer discourager wall 304 will be described in more detail below.

The alternate outer connection 92*c* of the FIG. 12 aspect also includes an outer liner connecting flange 108*a* having the outer liner connecting flange bushing 114 installed in an outer liner connecting flange opening 112*a*, and the CMC outer dome connecting flange 55*b* having the outer dome connecting flange bushing 228 installed in the outer dome connecting flange opening 226.

The alternate outer connection 92*c* further includes an outer connecting member 308 (e.g., a bushing bolt) that has an outer connector head 310 and an outer connector shank 312. The outer connector head 310 is arranged at a first end 314 of the outer connector shank 312 and includes an outer connector shoulder 316. At least a portion of a second end 318 of the outer connector shank 312 may have external threads 320, and the outer connector retention member 156 threadedly engages with the external threads 320. The outer connector head 310 includes a torque cavity 322 arranged within the outer connector head 310, and the torque cavity 322 may be the same as the torque cavity 140 of the FIG. 10 aspect and may have any of the configurations shown in FIG. 4A to FIG. 4D. The outer connecting member 308 has an outer surface 324, which may be a wear coating applied to the outer connector head 310. The wear coating may be, for example, a cobalt-molybdenum-chromium superalloy (such as Tribaloy® T-400®, T-800®, etc.). The outer surface 324 is ground or machined to have an external diameter 326 that is slightly less than the inner diameter 125 of the outer liner connecting flange bushing opening 122, and that is slightly less than the inner diameter 248 of the outer dome connecting flange bushing opening 230 so that both the outer liner connecting flange bushing 114 and the outer dome connecting flange bushing 228 slidingly engage with the outer surface 324 of the outer connecting member 308. The sliding engagement allows both the outer liner connecting flange 108*a* and the CMC outer dome connecting flange 55*b* to have radial movement. The outer connecting member 308, similar to the outer connecting member 126, includes a thermal activation opening 328 that extends through the outer connector shank 312 and through the outer connector head 310 to provide a flow of the compressed air 83 from the pressure plenum 66 therethrough. The thermal activation opening 328 may be the same as the thermal activation opening 160 of the outer connecting member 126, and may have any of the configurations described above with regard to FIG. 5.

In forming the alternate outer connection 92*c*, the outer connector shank 312 of the outer connecting member 308 is inserted through the outer liner connecting flange bushing opening 112*a* of the outer liner connecting flange bushing 114, through the outer dome connecting flange bushing opening 230, and through the outer cowl connecting flange opening 106*a* until the outer connector shoulder 316 of the outer connector head 310 engages with an outer side 330 of the outer cowl connecting flange 104*a*. The inner diameter 125 of the outer liner connecting flange bushing opening 122 slidingly engages with the outer surface 324 of the outer connector head 310, and the inner diameter 248 of the outer dome connecting flange bushing opening 230 slidingly engages with the outer surface 324 of the outer connector head 310. The washer 252 is installed over the outer connector shank 312, and the outer connector retention member 156 is threadedly engaged with the external threads 320 and torqued to tighten the alternate outer connection 92*c*.

An upstream end 332 of the outer liner connecting flange 108*a* is arranged adjacent to the outer discourager wall 304 with a gap 334 therebetween, such that, the upstream end 332 of the outer liner connecting flange 108*a* and the outer discourager wall 304 define an outer liner connecting flange discourager 336. The outer liner connecting flange discourager 336 functions as a seal so as to restrict or to limit the amount of the compressed air 85 that may pass from the outer flow passage 88 through the gap 334 and between the outer liner connecting flange 108*a* and the CMC outer dome connecting flange 55*b* into the combustion chamber 62. In addition, an upstream end 338 of the CMC outer dome connecting flange 55*b* is arranged adjacent to the outer discourager wall 304 with a gap 340 therebetween, such that, the upstream end 338 of the CMC outer dome connecting flange 55*b* and the outer discourager wall 304 define. The outer dome connecting flange discourager 342 functions as a seal so as to restrict or to limit the amount of the compressed air 83 that may pass from the pressure plenum 66 through the gap 340 and between the CMC outer dome connecting flange 55*b* and the outer liner connecting flange 108*a* into the combustion chamber 62.

Figure 13:
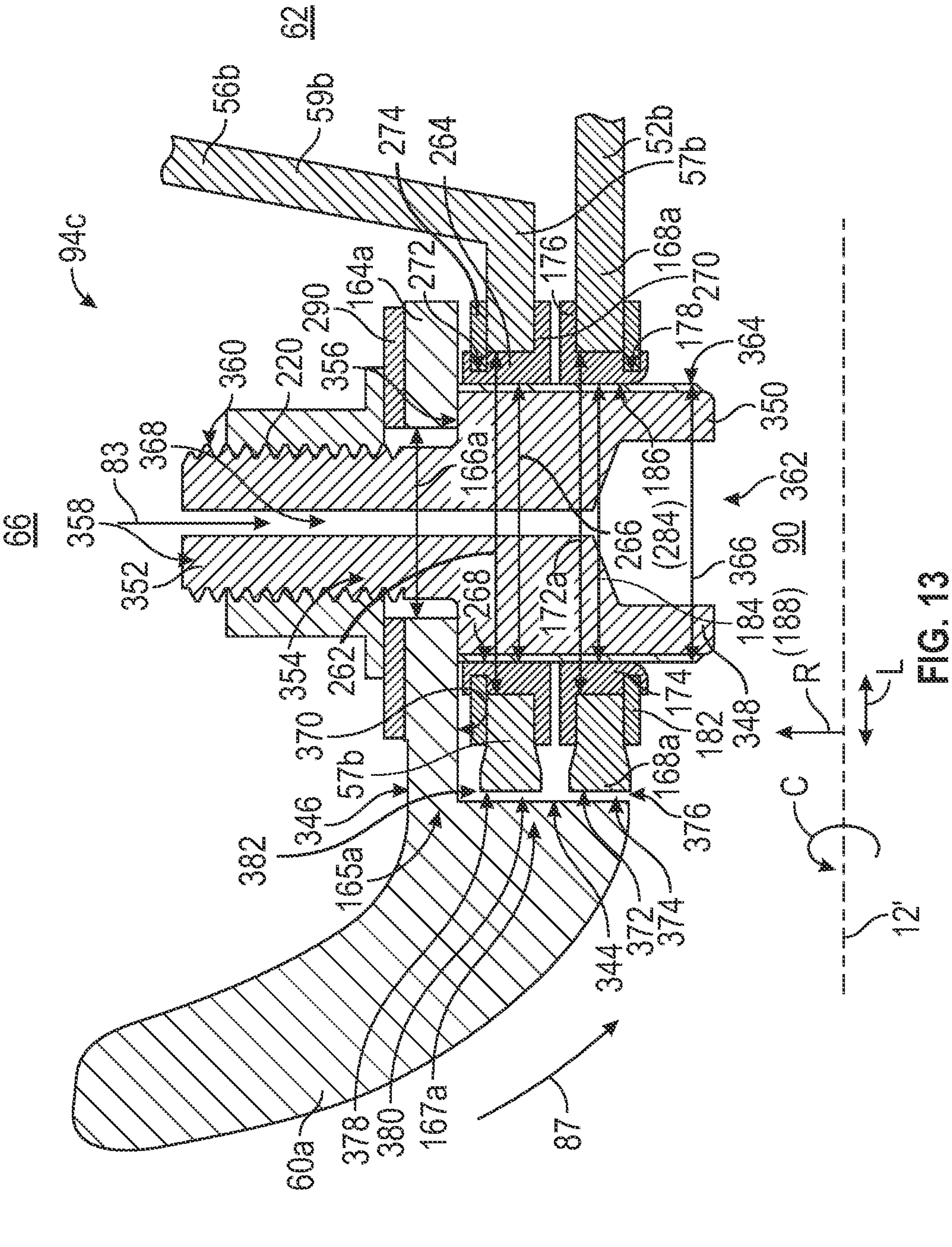
FIG. 13 depicts an alternate arrangement of an inner connection to that shown in FIG. 11, according to an aspect of the present disclosure.

FIG. 13 depicts an alternate arrangement of an inner connection 94*c* to that shown in FIG. 11, according to an aspect of the present disclosure. In the FIG. 13 aspect, elements that are same as those of the FIG. 11 aspect include the same reference numerals and the description of those elements provided above for the FIG. 11 aspect is applicable to the same elements in the FIG. 13 aspect. The FIG. 13 aspect includes the alternate cowl structure 60*a* that includes an inner cowl connecting flange 164*a* that extends in the longitudinal direction L with respect to the combustor centerline axis 12' from an outer side 165*a* of an inner cowl connecting flange root portion 167*a* of the alternate cowl structure 60*a*. Similar to the FIG. 11 aspect, the cowl structure 60*a* is a single flange (or single yoke) cowl structure in that, the inner cowl connecting flange 164*a* is not part of a dual flange (or clevis-type) connecting flange arrangement for connecting the alternate cowl structure 60*a* with a CMC inner liner 52*b* and with the CMC dome structure 56*b*. The inner cowl connecting flange 164*a* includes an inner cowl connecting flange opening 166*a* therethrough. One difference between the cowl structure 60 of the FIG. 11 aspect and the alternate cowl structure 60*a* of the FIG. 13 aspect is that the inner cowl connecting flange root portion 167*a* includes an inner discourager wall 344 that extends radially inward from an upstream end 346 of the inner cowl connecting flange 164*a*. The inner discourager wall 344 will be described in more detail below.

The alternate inner connection 94*c* of the FIG. 13 aspect also includes an inner liner connecting flange 168*a* having the inner liner connecting flange bushing 174 installed in an inner liner connecting flange opening 172*a*, and the CMC inner dome connecting flange 57*b* having the inner dome connecting flange bushing 264 installed in the inner dome connecting flange opening 262.

The alternate inner connection 94*c* further includes an inner connecting member 348 (e.g., a bushing bolt) that has an inner connector head 350 and an inner connector shank 352. The inner connector head 350 is arranged at a first end 354 of the inner connector shank 352 and includes an inner connector shoulder 356. At least a portion of a second end 358 of the inner connector shank 352 may have external threads 360, and the inner connector retention member 220 threadedly engages with the external threads 360. The inner connector head 350 includes a torque cavity 362 arranged within the inner connector head 350, and the torque cavity 362 may be the same as the torque cavity 204 of the FIG. 11 aspect and may have any of the configurations shown in FIG. 7A to FIG. 7D. The inner connecting member 348 has an outer surface 364, which may be a wear coating applied to the inner connector head 350. The wear coating may be, for example, a cobalt-molybdenum-chromium superalloy (such as Tribaloy®T-400®, T-800®, etc.). The outer surface 364 is ground or machined to have an external diameter 366 that is slightly less than the inner diameter 188 of the inner liner connecting flange bushing opening 184, and that is slightly less than the inner diameter 284 of the inner dome connecting flange bushing opening 266 so that both the inner liner connecting flange bushing 174 and the inner dome connecting flange bushing 264 slidingly engage with the outer surface 364 of the inner connecting member 348. The sliding engagement allows both the inner liner connecting flange 168*a* and the CMC inner dome connecting flange 57*b* to have radial movement. The inner connecting member 348, similar to the inner connecting member 190, includes a thermal activation opening 368 that extends through the inner connector shank 352 and through the inner connector head 350 to provide a flow of the compressed air 83 from the pressure plenum 66 therethrough. The thermal activation opening 368 may be the same as the thermal activation opening 224 of the inner connecting member 190, and may have any of the configurations described above with regard to FIG. 5.

In forming the alternate inner connection 94*c*, the inner connector shank 352 of the inner connecting member 348 is inserted through the inner liner connecting flange bushing opening 184 of the inner liner connecting flange bushing 174, through the inner dome connecting flange bushing opening 266, and through the inner cowl connecting flange opening 166*a* until the inner connector shoulder 356 of the inner connector head 350 engages with an inner side 370 of the inner cowl connecting flange 164*a*. The inner diameter 188 of the inner liner connecting flange bushing opening 184 slidingly engages with the outer surface 364 of the inner connector head 350, and the inner diameter 284 of the inner dome connecting flange bushing opening 266 slidingly engages with the outer surface 364 of the inner connector head 350. The washer 290 is installed over the inner connector shank 352, and the inner connector retention member 220 is threadedly engaged with the external threads 360 and torqued to tighten the alternate inner connection 94*c*.

An upstream end 372 of the inner liner connecting flange 168*a* is arranged adjacent to the inner discourager wall 344 with a gap 376 therebetween, such that, the upstream end 372 of the inner liner connecting flange 168*a* and the inner discourager wall 344 define an inner liner connecting flange discourager 376. The inner liner connecting flange discourager 376 functions as a seal so as to restrict or to limit the amount of the compressed air 87 that may pass from the inner flow passage 90 through the gap 374 and between the inner liner connecting flange 168*a* and the CMC inner dome connecting flange 57*b* into the combustion chamber 62. In addition, an upstream end 378 of the CMC inner dome connecting flange 57*b* is arranged adjacent to the inner discourager wall 344 with a gap 380 therebetween, such that, the upstream end 378 of the CMC inner dome connecting flange 57*b* and the inner discourager wall 344 define an inner dome connecting flange discourager 382. The inner dome connecting flange discourager 382 functions as a seal so as to restrict or to limit the amount of the compressed air 83 that may pass from the pressure plenum 66 through the gap 380 and between the CMC inner dome connecting flange 57*b* and the inner liner connecting flange 168*a* into the combustion chamber 62.

Figure 14:
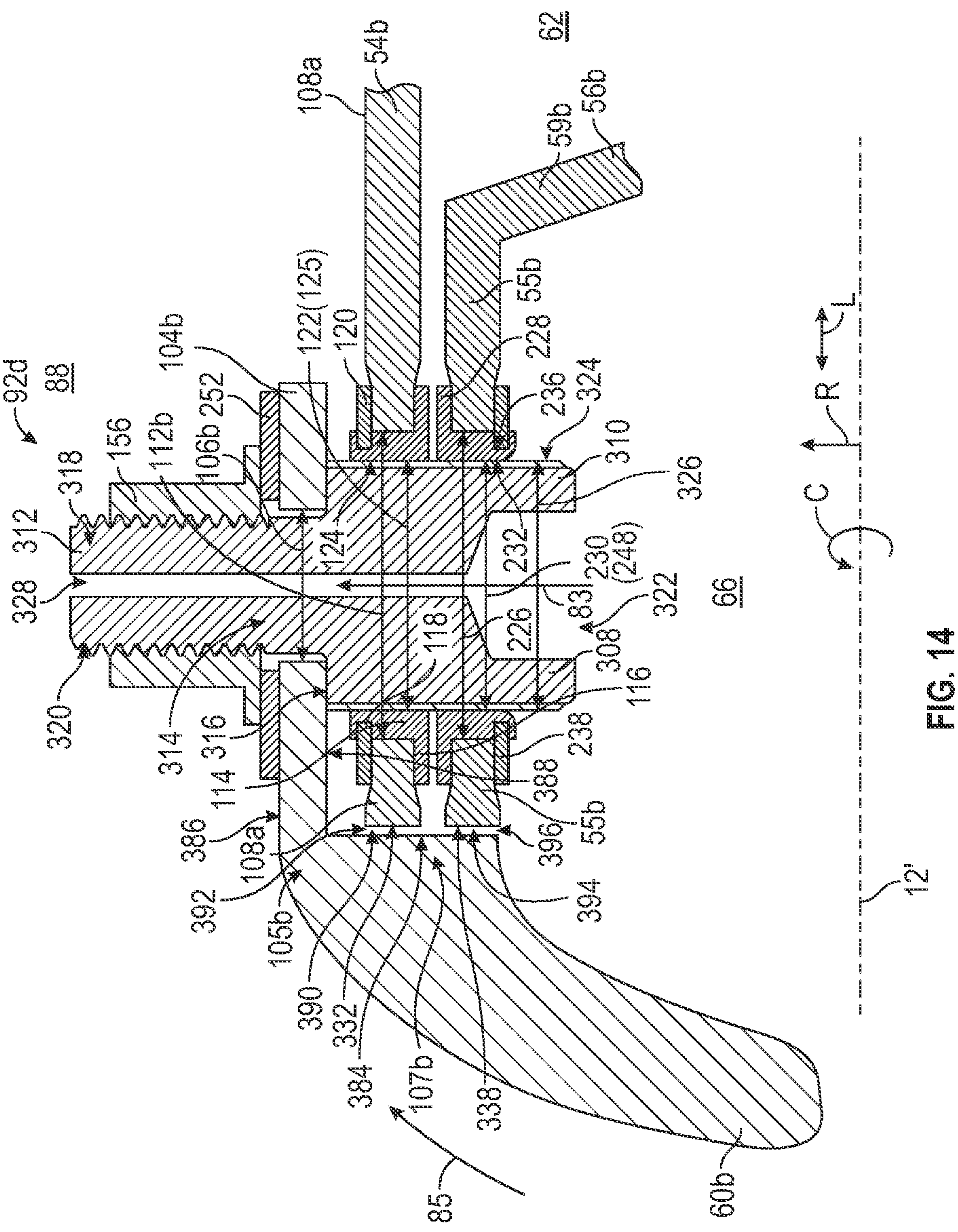
FIG. 14 depicts an alternate arrangement of an outer connection to that shown in FIG. 12, according to an aspect of the present disclosure.

FIG. 14 depicts an alternate arrangement of an outer connection 92*d* to that shown in FIG. 12, according to an aspect of the present disclosure. In the FIG. 14 aspect, elements that are same as those of the FIG. 12 aspect include the same reference numerals and the description of those elements provided above for the FIG. 12 aspect is applicable to the same elements in the FIG. 14 aspect. The FIG. 14 aspect includes an alternate cowl structure 60*b* that includes an outer cowl connecting flange 104*b* that extends in the longitudinal direction L with respect to the combustor centerline axis 12' from an outer side 105*b* of an outer cowl connecting flange root portion 107*b* of the alternate cowl structure 60*b*. Similar to the FIG. 12 aspect, the alternate cowl structure 60*b* is a single flange (or single yoke) cowl structure in that, the outer cowl connecting flange 104*b* is not part of a dual flange (or clevis-type) connecting flange arrangement for connecting the alternate cowl structure 60*b* with the CMC outer liner 54*b* and with the CMC dome structure 56*b*. The outer cowl connecting flange 104*b* includes an outer cowl connecting flange opening 106*b* therethrough. One difference between the alternate cowl structure 60*a* of the FIG. 12 aspect and the alternate cowl structure 60*b* of the FIG. 14 aspect is that the outer cowl connecting flange root portion 107*b* includes an outer discourager wall 384 that extends radially inward from an upstream end 386 of the outer cowl connecting flange 104*b*. The outer discourager wall 384 will be described in more detail below.

The alternate outer connection 92*d* of the FIG. 14 aspect also includes the outer liner connecting flange 108*a* having the outer liner connecting flange bushing 114 installed in the outer liner connecting flange opening 112*a*, and the CMC outer dome connecting flange 55*b* having the outer dome connecting flange bushing 228 installed in the outer dome connecting flange opening 226.

The alternate outer connection 92*d* further includes the outer connecting member 308 (e.g., a bushing bolt) that has the outer connector head 310 and the outer connector shank 312. In the FIG. 14 aspect, the outer connecting member 308 is merely installed in the reverse direction to that shown in the FIG. 12 aspect, and all other elements of the outer connecting member 308 in the FIG. 14 aspect are the same as those of the FIG. 12 aspect.

In forming the alternate outer connection 92*d*, the outer connector shank 312 of the outer connecting member 308 is inserted through the outer dome connecting flange bushing opening 230 of the outer dome connecting flange bushing 228, through the outer liner connecting flange bushing opening 122 of the outer liner connecting flange bushing 114, and through the outer cowl connecting flange opening 106*b* until the outer connector shoulder 316 of the outer connector head 310 engages with an inner side 388 of the outer cowl connecting flange 104*b*. The inner diameter 125 of the outer liner connecting flange bushing opening 122 slidingly engages with the outer surface 324 of the outer connector head 310, and the inner diameter 248 of the outer dome connecting flange bushing opening 230 slidingly engages with the outer surface 324 of the outer connector head 310. The washer 252 is installed over the outer connector shank 312, and the outer connector retention member 156 is threadedly engaged with the external threads 320 and torqued to tighten the alternate outer connection 92*d*.

The upstream end 332 of the outer liner connecting flange 108*a* is arranged adjacent to the outer discourager wall 384 with a gap 390 therebetween, such that, the upstream end 332 of the outer liner connecting flange 108*a* and the outer discourager wall 384 define an outer liner connecting flange discourager 392. The outer liner connecting flange discourager 392 functions as a seal so as to restrict or to limit the amount of the compressed air 87 that may pass from the outer flow passage 88 through the gap 390 and between the outer liner connecting flange 108*a* and the CMC outer dome connecting flange 55*b* into the combustion chamber 62. In addition, the upstream end 338 of the CMC outer dome connecting flange 55*b* is arranged adjacent to the outer discourager wall 384 with a gap 394 therebetween, such that, the upstream end 338 of the CMC outer dome connecting flange 55*b* and the outer discourager wall 384 define an outer dome connecting flange discourager 396. The outer dome connecting flange discourager 396 functions as a seal so as to restrict or to limit the amount of the compressed air 83 that may pass from the pressure plenum 66 through the gap 394 and between the CMC outer dome connecting flange 55*b* and the outer liner connecting flange 108*a* into the combustion chamber 62.

Figure 15:
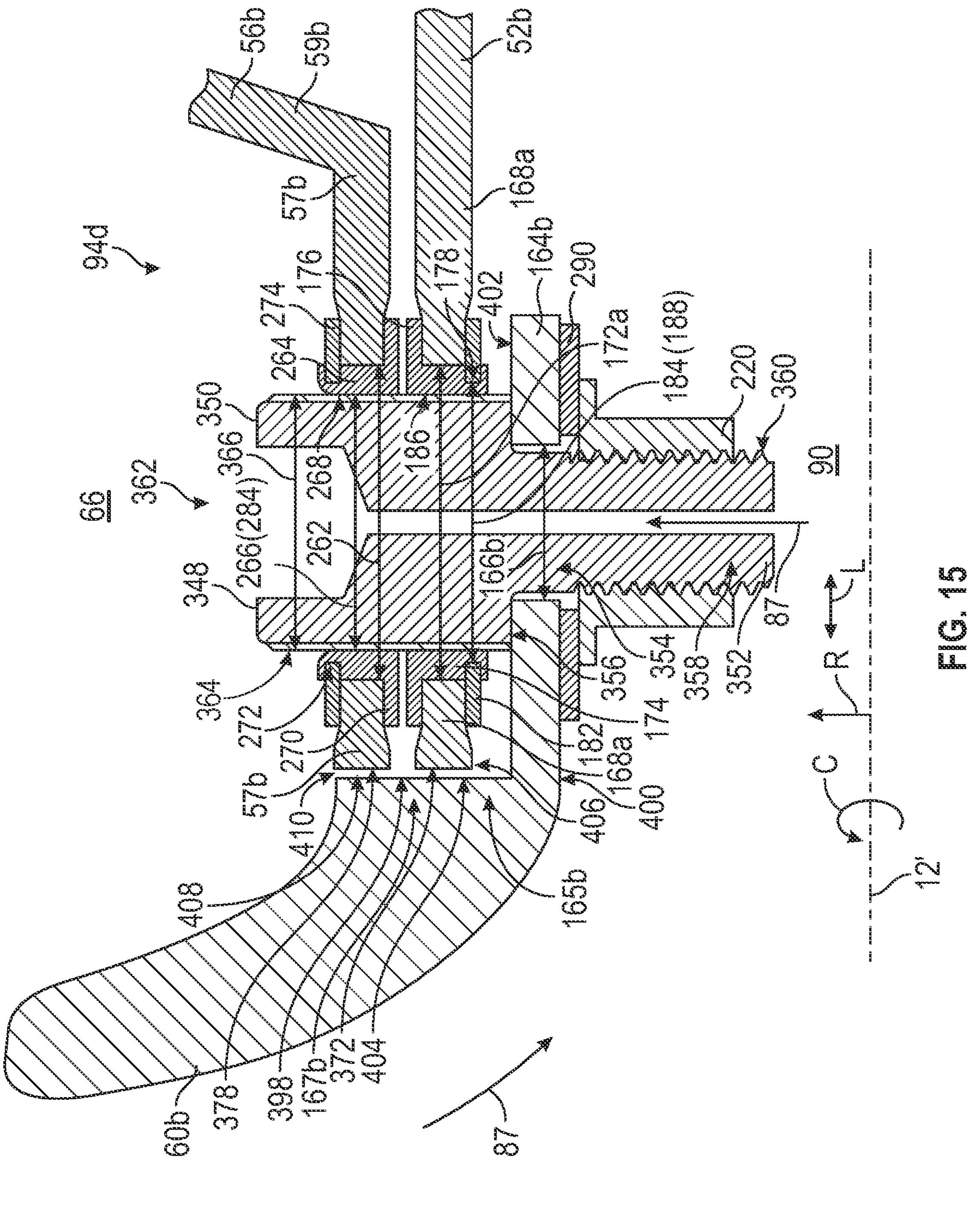
FIG. 15 depicts an alternate arrangement of an inner connection to that shown in FIG. 13, according to an aspect of the present disclosure.

FIG. 15 depicts an alternate arrangement of an inner connection 94*d* to that shown in FIG. 13, according to an aspect of the present disclosure. In the FIG. 15 aspect, elements that are same as those of the FIG. 13 aspect include the same reference numerals and the description of those elements provided above for the FIG. 13 aspect is applicable to the same elements in the FIG. 15 aspect. The FIG. 15 aspect includes the alternate cowl structure 60*b* that includes an inner cowl connecting flange 164*b* that extends in the longitudinal direction L with respect to the combustor centerline axis 12' from an inner side 165*b* of an inner cowl connecting flange root portion 167*b* of the alternate cowl structure 60*b*. Similar to the FIG. 13 aspect, the alternate cowl structure 60*b* is a single flange (or single yoke) cowl structure in that, the inner cowl connecting flange 164*b* is not part of a dual flange (or clevis-type) connecting flange arrangement for connecting the alternate cowl structure 60*b* with the CMC inner liner 52*b* and with the CMC dome structure 56*b*. The inner cowl connecting flange 164*b* includes an inner cowl connecting flange opening 166*b* therethrough. One difference between the alternate cowl structure 60*a* of the FIG. 13 aspect and the alternate cowl structure 60*b* of the FIG. 15 aspect is that the inner cowl connecting flange root portion 167*b* includes an inner discourager wall 398 that extends radially outward from an upstream end 400 of the inner cowl connecting flange 164*b*. The inner discourager wall 398 will be described in more detail below.

The alternate inner connection 94*d* of the FIG. 15 aspect also includes the inner liner connecting flange 168*a* having the inner liner connecting flange bushing 174 installed in the inner liner connecting flange opening 172*a*, and the CMC inner dome connecting flange 57*b* having the inner dome connecting flange bushing 264 installed in the inner dome connecting flange opening 262.

The alternate inner connection 94*d* further includes the inner connecting member 348 (e.g., a bushing bolt) that has the inner connector head 350 and the inner connector shank 352. In the FIG. 15 aspect, the inner connecting member 348 is merely installed in the reverse direction to that shown in the FIG. 13 aspect, and all other elements of the inner connecting member 348 in the FIG. 15 aspect are the same as those of the FIG. 13 aspect.

In forming the alternate inner connection 94*d*, the inner connector shank 352 of the inner connecting member 348 is inserted through the inner dome connecting flange bushing opening 266 of the inner dome connecting flange bushing 264, through the inner liner connecting flange bushing opening 184 of the inner liner connecting flange bushing 174, and through the inner cowl connecting flange opening 166*b* until the inner connector shoulder 356 of the inner connector head 350 engages with an outer side 402 of the inner cowl connecting flange 164*b*. The inner diameter 188 of the inner liner connecting flange bushing opening 184 slidingly engages with the outer surface 364 of the inner connector head 350, and the inner diameter 284 of the inner dome connecting flange bushing opening 266 slidingly engages with the outer surface 364 of the inner connector head 350. The washer 290 is installed over the inner connector shank 352, and the inner connector retention member 220 is threadedly engaged with the external threads 360 and torqued to tighten the alternate inner connection 94*d*.

The upstream end 372 of the inner liner connecting flange 168*a* is arranged adjacent to the inner discourager wall 398 with a gap 404 therebetween, such that, the upstream end 372 of the inner liner connecting flange 168*a* and the inner discourager wall 398 define an inner liner connecting flange discourager 406. The inner liner connecting flange discourager 406 functions as a seal so as to restrict or to limit the amount of the compressed air 87 that may pass from the inner flow passage 90 through the gap 404 and between the inner liner connecting flange 168*a* and the CMC inner dome connecting flange 57*b* into the combustion chamber 62. In addition, the upstream end 378 of the CMC inner dome connecting flange 57*b* is arranged adjacent to the inner discourager wall 398 with a gap 408 therebetween, such that, the upstream end 378 of the CMC inner dome connecting flange 57*b* and the inner discourager wall 398 define an inner dome connecting flange discourager 410. The inner dome connecting flange discourager 410 functions as a seal so as to restrict or to limit the amount of the compressed air 83 that may pass from the pressure plenum 66 through the gap 4208 and between the CMC inner dome connecting flange 57*b* and the inner liner connecting flange 168*a* into the combustion chamber 62.

Each of the foregoing aspects provides a technique to connect the CMC components and metallic components utilizing the bushing bolt. The CM outer liner, the CMC inner liner, and the metallic cowl structure are connected in a manner that allows the CMC components to have radial movement via the bushing bolt and a bushing that slidingly engages with the outer surface of the head of the bushing bolt. The bushing bolt of the present disclosure includes also includes the thermal activation opening that provides airflow through the bushing bolt so as to further the cooling (or heating) of the bushing bolt in relation to the connected elements. As a result, the thermal activation allows the bushing bolt to expand or contract at a rate that is closer to that of the connected components. Further, the overall weight of the connections is reduced due to the inclusion of the thermal activation openings and the torque cavity within the bushing bolts. Still further, the overall radial profile of the connection is reduced by the implementation of the bushing bolts and the bushing connection of the outer liner and the inner liner to the bushing bolts. As a result, less turbulence is created in the compressed air flowing from the combustor plenum into the outer airflow passage and into the inner airflow passage.

In addition to the combustor aspects described here, the invention could be applied in other areas involving the physical mounting of a CMC component (or other material with a significant mismatch in thermal expansion coefficient relative to metallic materials) to an adjacent metallic structure or a CMC component to another adjacent CMC component within a gas turbine engine and other applications within the aerospace and defense sectors. For example, within a gas turbine engine, connection techniques described herein could also be implemented in turbine ring shrouds, turbine segmented shrouds, exhaust nozzle and afterburner components, and interfaces between adjacent hot-section engine modules. Additional propulsion related applications, besides a gas turbine engine, in which the present disclosure could also be implemented include combustion components on ramjet/scramjet engines, including liners, flame holders, and connections between these various parts. The present disclosure could also be utilized in rocket engine combustors and on hypersonic vehicles, including attachment mechanisms of thermal protection systems. Further, the bushing bolt orientation is not limited to a radial vector as described herein, but could be used axially, tangentially, etc., depending on the component design and the mounting location. The ability to thermally activate the bolt is specific to the application being used and dependent on a pressure gradient being present to drive flow thru the bolt. Additionally, the shape of the components being attached to one another doesn't require them to be axisymmetric or round in geometry; they can take on myriad shapes including flat panels, conical members, etc.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing.

The combustor according to the preceding clause, wherein the outer liner is a ceramic matrix composite (CMC) outer liner and the outer liner connecting flange includes the outer liner connecting flange bushing, and the dome structure is a metallic dome structure and includes an outer dome connecting flange opening extending through the outer dome connecting flange and does not include the outer dome connecting flange bushing.

The combustor according to any preceding clause, wherein the outer connecting member extends through the outer liner connecting flange bushing opening, through the outer dome connecting flange opening, and through the outer cowl connecting flange opening, and the outer surface of the outer connector head slidingly engages with the inner surface of the outer liner connecting flange bushing opening.

The combustor according to any preceding clause, wherein the outer connector head is arranged at a first end of the outer connector shank and includes an outer connector shoulder, an outer connector retention member is connected to a second end of the outer connector shank opposite the outer connector head, the outer connector shoulder engages with an outer side of the outer dome connecting flange, and the outer connector retention member engages with an inner side of the outer cowl connecting flange.

The combustor according to any preceding clause, wherein the dome structure is a ceramic matrix composite (CMC) dome structure and includes the outer dome connecting flange bushing, and the outer liner is a metallic outer liner that includes an outer liner connecting flange opening extending through the outer liner connecting flange and does not include the outer liner connecting flange bushing.

The combustor according to any preceding clause, wherein the outer connecting member extends through the outer dome connecting flange bushing opening, through the outer cowl connecting flange opening, and through the outer liner connecting flange opening, and the outer surface of the outer connector head slidingly engages with the inner surface of the outer dome connecting flange bushing opening.

The combustor according to any preceding clause, wherein the outer connector head is arranged at a first end of the outer connector shank and includes an outer connector shoulder, an outer connector retention member is connected to a second end of the outer connector shank opposite the outer connector head, the outer connector shoulder engages with an inner side of the outer cowl connecting flange, and the outer connector retention member engages with an outer side of the outer liner connecting flange.

The combustor according to any preceding clause, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing.

The combustor according to any preceding clause, wherein outer cowl connecting flange is arranged on an inner side of an outer cowl connecting flange root portion of the cowl structure, the outer dome connecting flange and the outer liner connecting flange are arranged on an outer side of the outer cowl connecting flange, and the outer surface of the outer connector head engages with both the inner surface of the outer dome connecting flange bushing opening and the inner surface of the outer liner connecting flange bushing opening.

The combustor according to any preceding clause, wherein outer cowl connecting flange is arranged on an outer side of an outer cowl connecting flange root portion of the cowl structure, the outer dome connecting flange and the outer liner connecting flange are arranged on an inner side of the outer cowl connecting flange, and the outer surface of the outer connector head engages with both the inner surface of the outer dome connecting flange bushing opening and the inner surface of the outer liner connecting flange bushing opening.

The combustor according to any preceding clause, wherein the outer surface of the outer connector head slidingly engages with the inner surface of the outer liner connecting flange bushing opening, and the outer connection further includes an outer dome connector bushing extending through the outer dome connecting flange bushing opening and having an outer surface that slidingly engages with the inner surface of the outer dome connecting flange bushing opening, the outer connecting member extending through the outer dome connector bushing.

The combustor according to any preceding clause, wherein the outer connector head is arranged at a first end of the outer connector shank and includes an outer connector shoulder, the outer connector shoulder engages with an outer side of the outer cowl connecting flange, an outer side of the outer dome connector bushing engages with an inner side of the outer cowl connecting flange, and the outer connection further includes an outer connector retention member engaging with a second end of the outer connector shank, and a radial stop washer is arranged between the outer connector retention member and an inner side of the outer dome connector bushing.

The combustor according to any preceding clause, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing.

The combustor according to any preceding clause, wherein at least one of the outer connecting member and the inner connecting member includes (1) a thermal activation opening extending therethrough, or (2) a torque cavity arranged within one of the outer connector head and the inner connector head.

The combustor according to any preceding clause, wherein the inner liner is a ceramic matrix composite (CMC) inner liner and the inner liner connecting flange includes the inner liner connecting flange bushing, and the dome structure is a metallic dome structure and includes an inner dome connecting flange opening extending through the inner dome connecting flange and does not include the inner dome connecting flange bushing, the inner connecting member extends through the inner liner connecting flange bushing opening, through the inner dome connecting flange opening, and through the inner cowl connecting flange opening, and the outer surface of the inner connector head slidingly engages with the inner surface of the inner liner connecting flange bushing opening.

The combustor according to any preceding clause, wherein the dome structure is a ceramic matrix composite (CMC) dome structure and the inner dome connecting flange includes the inner dome connecting flange bushing, and the inner liner is a metallic inner liner that includes an inner liner connecting flange opening extending through the inner liner connecting flange and does not include the inner liner connecting flange bushing, the inner connecting member extends through the inner dome connecting flange bushing opening, through the inner cowl connecting flange opening, and through the inner liner connecting flange opening, and the outer surface of the inner connector head slidingly engages with the inner surface of the inner dome connecting flange bushing opening.

The combustor according to any preceding clause, wherein the dome structure is a ceramic matrix composite (CMC) dome structure and the inner dome connecting flange includes the inner dome connecting flange bushing, and the inner liner is a CMC inner liner and the inner liner connecting flange includes the inner liner connecting flange bushing.

The combustor according to any preceding clause, wherein the outer surface of the inner connector head slidingly engages with the inner surface of the inner liner connecting flange bushing opening, and the inner connection further includes an inner dome connector bushing extending through the inner dome connecting flange bushing opening and having an outer surface that slidingly engages with the inner surface of the inner dome connecting flange bushing opening, the inner connecting member extending through the inner dome connector bushing.

The combustor according to any preceding clause, wherein inner cowl connecting flange is arranged on an outer side of an inner cowl connecting flange root portion of the cowl structure, the inner dome connecting flange and the inner liner connecting flange are arranged on an inner side of the inner cowl connecting flange, and the outer surface of the inner connector head engages with both the inner surface of the inner dome connecting flange bushing opening and the inner surface of the inner liner connecting flange bushing opening.

The combustor according to any preceding clause, wherein inner cowl connecting flange is arranged on an inner side of an inner cowl connecting flange root portion of the cowl structure, the inner dome connecting flange and the inner liner connecting flange are arranged on an outer side of the inner cowl connecting flange, and the outer surface of the inner connector head engages with both the inner surface of the inner dome connecting flange bushing opening and the inner surface of the inner liner connecting flange bushing opening.

The combustor according to any preceding clause, wherein the cowl structure includes an outer side and an inner side, the outer side including an outer cowl connecting flange root portion that includes an outer discourager wall, and the inner side including an inner cowl connecting flange root portion that includes an inner discourager wall.

The combustor according to any preceding clause, wherein an upstream end of the outer liner connecting flange is arranged adjacent to the outer discourager wall with a gap therebetween, such that, the upstream end of the outer liner connecting flange and the outer discourager wall define an outer liner connecting flange discourager.

The combustor according to any preceding clause, wherein the outer liner connecting flange discourager restricts a flow of compressed air through the gap between the upstream end of the outer liner connecting flange and the outer discourager wall.

The combustor according to any preceding clause, wherein an upstream end of the outer dome connecting flange is arranged adjacent to the outer discourager wall with a gap therebetween, such that, the upstream end of the outer dome connecting flange and the outer discourager wall define an outer dome connecting flange discourager.

The combustor according to any preceding clause, wherein the outer dome connecting flange discourager restricts a flow of compressed air through the gap between the upstream end of the outer dome connecting flange and the outer discourager wall.

The combustor according to any preceding clause, wherein an upstream end of the inner liner connecting flange is arranged adjacent to the inner discourager wall with a gap therebetween, such that, the upstream end of the inner liner connecting flange and the inner discourager wall define an inner liner connecting flange discourager.

The combustor according to any preceding clause, wherein the inner liner connecting flange discourager restricts a flow of compressed air through the gap between the upstream end of the inner liner connecting flange and the inner discourager wall.

The combustor according to any preceding clause, wherein an upstream end of the inner dome connecting flange is arranged adjacent to the inner discourager wall with a gap therebetween, such that, the upstream end of the inner dome connecting flange and the inner discourager wall define an inner dome connecting flange discourager.

The combustor according to any preceding clause, wherein the inner dome connecting flange discourager restricts a flow of compressed air through the gap between the upstream end of the inner dome connecting flange and the inner discourager wall.

The combustor according to any preceding clause, wherein an outer seal cavity is defined between the outer liner connecting flange and the outer dome connecting flange, and an outer seal member is arranged within the outer seal cavity so as to restrict a flow of compressed air from the outer seal cavity into a combustor chamber.

The combustor according to any preceding clause, wherein an inner seal cavity is defined between the inner liner connecting flange and the inner dome connecting flange, and an inner seal member is arranged within the inner seal cavity so as to restrict a flow of compressed air from the inner seal cavity into a combustor chamber.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the outer liner is a ceramic matrix composite (CMC) outer liner and the outer liner connecting flange includes the outer liner connecting flange bushing, and the dome structure is a metallic dome structure and includes an outer dome connecting flange opening extending through the outer dome connecting flange and does not include the outer dome connecting flange bushing, and wherein the inner liner is a ceramic matrix composite (CMC) inner liner and the inner liner connecting flange includes the inner liner connecting flange bushing, and the dome structure is a metallic dome structure and includes an inner dome connecting flange opening extending through the inner dome connecting flange and does not include the inner dome connecting flange bushing, the inner connecting member extends through the inner liner connecting flange bushing opening, through the inner dome connecting flange opening, and through the inner cowl connecting flange opening, and the outer surface of the inner connector head slidingly engages with the inner surface of the inner liner connecting flange bushing opening.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and includes the outer dome connecting flange bushing, and the outer liner is a metallic outer liner that includes an outer liner connecting flange opening extending through the outer liner connecting flange and does not include the outer liner connecting flange bushing, and wherein the dome structure is a ceramic matrix composite (CMC) dome structure and the inner dome connecting flange includes the inner dome connecting flange bushing, and the inner liner is a metallic inner liner that includes an inner liner connecting flange opening extending through the inner liner connecting flange and does not include the inner liner connecting flange bushing, the inner connecting member extends through the inner dome connecting flange bushing opening, through the inner cowl connecting flange opening, and through the inner liner connecting flange opening, and the outer surface of the inner connector head slidingly engages with the inner surface of the inner dome connecting flange bushing opening.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, and wherein the outer surface of the outer connector head slidingly engages with the inner surface of the outer liner connecting flange bushing opening, and the outer connection further includes an outer dome connector bushing extending through the outer dome connecting flange bushing opening and having an outer surface that slidingly engages with the inner surface of the outer dome connecting flange bushing opening, the outer connecting member extending through the outer dome connector bushing, and wherein the outer surface of the inner connector head slidingly engages with the inner surface of the inner liner connecting flange bushing opening, and the inner connection further includes an inner dome connector bushing extending through the inner dome connecting flange bushing opening and having an outer surface that slidingly engages with the inner surface of the inner dome connecting flange bushing opening, the inner connecting member extending through the inner dome connector bushing.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, wherein outer cowl connecting flange is arranged on an inner side of an outer cowl connecting flange root portion of the cowl structure, the outer dome connecting flange and the outer liner connecting flange are arranged on an outer side of the outer cowl connecting flange, and the outer surface of the outer connector head engages with both the inner surface of the outer dome connecting flange bushing opening and the inner surface of the outer liner connecting flange bushing opening, and wherein inner cowl connecting flange is arranged on an outer side of an inner cowl connecting flange root portion of the cowl structure, the inner dome connecting flange and the inner liner connecting flange are arranged on an inner side of the inner cowl connecting flange, and the outer surface of the inner connector head engages with both the inner surface of the inner dome connecting flange bushing opening and the inner surface of the inner liner connecting flange bushing opening.

A combustor for a gas turbine engine, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, wherein outer cowl connecting flange is arranged on an outer side of an outer cowl connecting flange root portion of the cowl structure, the outer dome connecting flange and the outer liner connecting flange are arranged on an inner side of the outer cowl connecting flange, and the outer surface of the outer connector head engages with both the inner surface of the outer dome connecting flange bushing opening and the inner surface of the outer liner connecting flange bushing opening, and wherein inner cowl connecting flange is arranged on an inner side of an inner cowl connecting flange root portion of the cowl structure, the inner dome connecting flange and the inner liner connecting flange are arranged on an outer side of the inner cowl connecting flange, and the outer surface of the inner connector head engages with both the inner surface of the inner dome connecting flange bushing opening and the inner surface of the inner liner connecting flange bushing opening.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing.

The gas turbine engine according to the preceding clause, wherein the outer liner is a ceramic matrix composite (CMC) outer liner and the outer liner connecting flange includes the outer liner connecting flange bushing, and the dome structure is a metallic dome structure and includes an outer dome connecting flange opening extending through the outer dome connecting flange and does not include the outer dome connecting flange bushing.

The gas turbine engine according to any preceding clause, wherein the outer connecting member extends through the outer liner connecting flange bushing opening, through the outer dome connecting flange opening, and through the outer cowl connecting flange opening, and the outer surface of the outer connector head slidingly engages with the inner surface of the outer liner connecting flange bushing opening.

The gas turbine engine according to any preceding clause, wherein the outer connector head is arranged at a first end of the outer connector shank and includes an outer connector shoulder, an outer connector retention member is connected to a second end of the outer connector shank opposite the outer connector head, the outer connector shoulder engages with an outer side of the outer dome connecting flange, and the outer connector retention member engages with an inner side of the outer cowl connecting flange.

The gas turbine engine according to any preceding clause, wherein the dome structure is a ceramic matrix composite (CMC) dome structure and includes the outer dome connecting flange bushing, and the outer liner is a metallic outer liner that includes an outer liner connecting flange opening extending through the outer liner connecting flange and does not include the outer liner connecting flange bushing.

The gas turbine engine according to any preceding clause, wherein the outer connecting member extends through the outer dome connecting flange bushing opening, through the outer cowl connecting flange opening, and through the outer liner connecting flange opening, and the outer surface of the outer connector head slidingly engages with the inner surface of the outer dome connecting flange bushing opening.

The gas turbine engine according to any preceding clause, wherein the outer connector head is arranged at a first end of the outer connector shank and includes an outer connector shoulder, an outer connector retention member is connected to a second end of the outer connector shank opposite the outer connector head, the outer connector shoulder engages with an inner side of the outer cowl connecting flange, and the outer connector retention member engages with an outer side of the outer liner connecting flange.

The gas turbine engine according to any preceding clause, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing.

The gas turbine engine according to any preceding clause, wherein outer cowl connecting flange is arranged on an inner side of an outer cowl connecting flange root portion of the cowl structure, the outer dome connecting flange and the outer liner connecting flange are arranged on an outer side of the outer cowl connecting flange, and the outer surface of the outer connector head engages with both the inner surface of the outer dome connecting flange bushing opening and the inner surface of the outer liner connecting flange bushing opening.

The gas turbine engine according to any preceding clause, wherein outer cowl connecting flange is arranged on an outer side of an outer cowl connecting flange root portion of the cowl structure, the outer dome connecting flange and the outer liner connecting flange are arranged on an inner side of the outer cowl connecting flange, and the outer surface of the outer connector head engages with both the inner surface of the outer dome connecting flange bushing opening and the inner surface of the outer liner connecting flange bushing opening.

The gas turbine engine according to any preceding clause, wherein the outer surface of the outer connector head slidingly engages with the inner surface of the outer liner connecting flange bushing opening, and the outer connection further includes an outer dome connector bushing extending through the outer dome connecting flange bushing opening and having an outer surface that slidingly engages with the inner surface of the outer dome connecting flange bushing opening, the outer connecting member extending through the outer dome connector bushing.

The gas turbine engine according to any preceding clause, wherein the outer connector head is arranged at a first end of the outer connector shank and includes an outer connector shoulder, the outer connector shoulder engages with an outer side of the outer cowl connecting flange, an outer side of the outer dome connector bushing engages with an inner side of the outer cowl connecting flange, and the outer connection further includes an outer connector retention member engaging with a second end of the outer connector shank, and a radial stop washer is arranged between the outer connector retention member and an inner side of the outer dome connector bushing.

The gas turbine engine according to any preceding clause, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing.

The gas turbine engine according to any preceding clause, wherein at least one of the outer connecting member and the inner connecting member includes (1) a thermal activation opening extending therethrough, or (2) a torque cavity arranged within one of the outer connector head and the inner connector head.

The gas turbine engine according to any preceding clause, wherein the inner liner is a ceramic matrix composite (CMC) inner liner and the inner liner connecting flange includes the inner liner connecting flange bushing, and the dome structure is a metallic dome structure and includes an inner dome connecting flange opening extending through the inner dome connecting flange and does not include the inner dome connecting flange bushing, the inner connecting member extends through the inner liner connecting flange bushing opening, through the inner dome connecting flange opening, and through the inner cowl connecting flange opening, and the outer surface of the inner connector head slidingly engages with the inner surface of the inner liner connecting flange bushing opening.

The gas turbine engine according to any preceding clause, wherein the dome structure is a ceramic matrix composite (CMC) dome structure and the inner dome connecting flange includes the inner dome connecting flange bushing, and the inner liner is a metallic inner liner that includes an inner liner connecting flange opening extending through the inner liner connecting flange and does not include the inner liner connecting flange bushing, the inner connecting member extends through the inner dome connecting flange bushing opening, through the inner cowl connecting flange opening, and through the inner liner connecting flange opening, and the outer surface of the inner connector head slidingly engages with the inner surface of the inner dome connecting flange bushing opening.

The gas turbine engine according to any preceding clause, wherein the dome structure is a ceramic matrix composite (CMC) dome structure and the inner dome connecting flange includes the inner dome connecting flange bushing, and the inner liner is a CMC inner liner and the inner liner connecting flange includes the inner liner connecting flange bushing.

The gas turbine engine according to any preceding clause, wherein the outer surface of the inner connector head slidingly engages with the inner surface of the inner liner connecting flange bushing opening, and the inner connection further includes an inner dome connector bushing extending through the inner dome connecting flange bushing opening and having an outer surface that slidingly engages with the inner surface of the inner dome connecting flange bushing opening, the inner connecting member extending through the inner dome connector bushing.

The gas turbine engine according to any preceding clause, wherein inner cowl connecting flange is arranged on an outer side of an inner cowl connecting flange root portion of the cowl structure, the inner dome connecting flange and the inner liner connecting flange are arranged on an inner side of the inner cowl connecting flange, and the outer surface of the inner connector head engages with both the inner surface of the inner dome connecting flange bushing opening and the inner surface of the inner liner connecting flange bushing opening.

The gas turbine engine according to any preceding clause, wherein inner cowl connecting flange is arranged on an inner side of an inner cowl connecting flange root portion of the cowl structure, the inner dome connecting flange and the inner liner connecting flange are arranged on an outer side of the inner cowl connecting flange, and the outer surface of the inner connector head engages with both the inner surface of the inner dome connecting flange bushing opening and the inner surface of the inner liner connecting flange bushing opening.

The gas turbine engine according to any preceding clause, wherein the cowl structure includes an outer side and an inner side, the outer side including an outer cowl connecting flange root portion that includes an outer discourager wall, and the inner side including an inner cowl connecting flange root portion that includes an inner discourager wall.

The gas turbine engine according to any preceding clause, wherein an upstream end of the outer liner connecting flange is arranged adjacent to the outer discourager wall with a gap therebetween, such that, the upstream end of the outer liner connecting flange and the outer discourager wall define an outer liner connecting flange discourager.

The gas turbine engine according to any preceding clause, wherein the outer liner connecting flange discourager restricts a flow of compressed air through the gap between the upstream end of the outer liner connecting flange and the outer discourager wall.

The gas turbine engine according to any preceding clause, wherein an upstream end of the outer dome connecting flange is arranged adjacent to the outer discourager wall with a gap therebetween, such that, the upstream end of the outer dome connecting flange and the outer discourager wall define an outer dome connecting flange discourager.

The gas turbine engine according to any preceding clause, wherein the outer dome connecting flange discourager restricts a flow of compressed air through the gap between the upstream end of the outer dome connecting flange and the outer discourager wall.

The gas turbine engine according to any preceding clause, wherein an upstream end of the inner liner connecting flange is arranged adjacent to the inner discourager wall with a gap therebetween, such that, the upstream end of the inner liner connecting flange and the inner discourager wall define an inner liner connecting flange discourager.

The gas turbine engine according to any preceding clause, wherein the inner liner connecting flange discourager restricts a flow of compressed air through the gap between the upstream end of the inner liner connecting flange and the inner discourager wall.

The gas turbine engine according to any preceding clause, wherein an upstream end of the inner dome connecting flange is arranged adjacent to the inner discourager wall with a gap therebetween, such that, the upstream end of the inner dome connecting flange and the inner discourager wall define an inner dome connecting flange discourager.

The gas turbine engine according to any preceding clause, wherein the inner dome connecting flange discourager restricts a flow of compressed air through the gap between the upstream end of the inner dome connecting flange and the inner discourager wall.

The gas turbine engine according to any preceding clause, wherein an outer seal cavity is defined between the outer liner connecting flange and the outer dome connecting flange, and an outer seal member is arranged within the outer seal cavity so as to restrict a flow of compressed air from the outer seal cavity into a combustor chamber.

The gas turbine engine according to any preceding clause, wherein an inner seal cavity is defined between the inner liner connecting flange and the inner dome connecting flange, and an inner seal member is arranged within the inner seal cavity so as to restrict a flow of compressed air from the inner seal cavity into a combustor chamber.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the outer liner is a ceramic matrix composite (CMC) outer liner and the outer liner connecting flange includes the outer liner connecting flange bushing, and the dome structure is a metallic dome structure and includes an outer dome connecting flange opening extending through the outer dome connecting flange and does not include the outer dome connecting flange bushing, and wherein the inner liner is a ceramic matrix composite (CMC) inner liner and the inner liner connecting flange includes the inner liner connecting flange bushing, and the dome structure is a metallic dome structure and includes an inner dome connecting flange opening extending through the inner dome connecting flange and does not include the inner dome connecting flange bushing, the inner connecting member extends through the inner liner connecting flange bushing opening, through the inner dome connecting flange opening, and through the inner cowl connecting flange opening, and the outer surface of the inner connector head slidingly engages with the inner surface of the inner liner connecting flange bushing opening.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and includes the outer dome connecting flange bushing, and the outer liner is a metallic outer liner that includes an outer liner connecting flange opening extending through the outer liner connecting flange and does not include the outer liner connecting flange bushing, and wherein the dome structure is a ceramic matrix composite (CMC) dome structure and the inner dome connecting flange includes the inner dome connecting flange bushing, and the inner liner is a metallic inner liner that includes an inner liner connecting flange opening extending through the inner liner connecting flange and does not include the inner liner connecting flange bushing, the inner connecting member extends through the inner dome connecting flange bushing opening, through the inner cowl connecting flange opening, and through the inner liner connecting flange opening, and the outer surface of the inner connector head slidingly engages with the inner surface of the inner dome connecting flange bushing opening.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, and wherein the outer surface of the outer connector head slidingly engages with the inner surface of the outer liner connecting flange bushing opening, and the outer connection further includes an outer dome connector bushing extending through the outer dome connecting flange bushing opening and having an outer surface that slidingly engages with the inner surface of the outer dome connecting flange bushing opening, the outer connecting member extending through the outer dome connector bushing, and wherein the outer surface of the inner connector head slidingly engages with the inner surface of the inner liner connecting flange bushing opening, and the inner connection further includes an inner dome connector bushing extending through the inner dome connecting flange bushing opening and having an outer surface that slidingly engages with the inner surface of the inner dome connecting flange bushing opening, the inner connecting member extending through the inner dome connector bushing.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, wherein outer cowl connecting flange is arranged on an inner side of an outer cowl connecting flange root portion of the cowl structure, the outer dome connecting flange and the outer liner connecting flange are arranged on an outer side of the outer cowl connecting flange, and the outer surface of the outer connector head engages with both the inner surface of the outer dome connecting flange bushing opening and the inner surface of the outer liner connecting flange bushing opening, and wherein inner cowl connecting flange is arranged on an outer side of an inner cowl connecting flange root portion of the cowl structure, the inner dome connecting flange and the inner liner connecting flange are arranged on an inner side of the inner cowl connecting flange, and the outer surface of the inner connector head engages with both the inner surface of the inner dome connecting flange bushing opening and the inner surface of the inner liner connecting flange bushing opening.

A gas turbine engine including a compressor section, a turbine section drivingly connected with the compressor section, and a combustor arranged in fluid communication with the compressor section to receive a flow of compressed air from the compressor section, and in fluid communication with the turbine section to provide a flow of combustion gases from the combustor to the turbine section, the combustor including a dome structure including an outer dome connecting flange extending in a longitudinal direction with respect to a combustor centerline axis, a cowl structure including an outer cowl connecting flange extending in the longitudinal direction with respect to the combustor centerline axis and having an outer cowl connecting flange opening extending through the outer cowl connecting flange, an outer liner including an outer liner connecting flange extending in the longitudinal direction at an upstream end of the outer liner, and an outer connection connecting the outer dome connecting flange, the outer cowl connecting flange, and the outer liner connecting flange, wherein at least one of (a) the outer liner connecting flange includes an outer liner connecting flange bushing having an outer liner connecting flange bushing opening therethrough, or (b) the outer dome connecting flange includes an outer dome connecting flange bushing having an outer dome connecting flange bushing opening therethrough, the outer connection includes an outer connecting member having an outer connector head and an outer connector shank, an outer surface of the outer connector head slidingly engaging with at least one of (i) an inner surface of the outer liner connecting flange bushing opening of the outer liner connecting flange bushing, or (ii) an inner surface of the outer dome connecting flange bushing opening of the outer dome connecting flange bushing, wherein the dome structure includes an inner dome connecting flange extending in the longitudinal direction, and the cowl structure includes an inner cowl connecting flange extending in the longitudinal direction and having an inner cowl connecting flange opening through the inner cowl connecting flange, the combustor further including an inner liner including an inner liner connecting flange extending in the longitudinal direction at an upstream end of the inner liner, and an inner connection connecting the inner dome connecting flange, the inner cowl connecting flange, and the inner liner connecting flange, wherein at least one of (c) the inner liner connecting flange includes an inner liner connecting flange bushing having an inner liner connecting flange bushing opening therethrough, or (d) the inner dome connecting flange includes an inner dome connecting flange bushing having an inner dome connecting flange bushing opening therethrough, the inner connection includes an inner connecting member having an inner connector head and an inner connector shank, an outer surface of the inner connector head slidingly engaging with at least one of (iii) an inner surface of the inner liner connecting flange bushing opening of the inner liner connecting flange bushing, or (iv) an inner surface of the inner dome connecting flange bushing opening of the inner dome connecting flange bushing, wherein the dome structure is a ceramic matrix composite (CMC) dome structure and the outer dome connecting flange includes the outer dome connecting flange bushing, and the outer liner is a CMC outer liner and the outer liner connecting flange includes the outer liner connecting flange bushing, wherein outer cowl connecting flange is arranged on an outer side of an outer cowl connecting flange root portion of the cowl structure, the outer dome connecting flange and the outer liner connecting flange are arranged on an inner side of the outer cowl connecting flange, and the outer surface of the outer connector head engages with both the inner surface of the outer dome connecting flange bushing opening and the inner surface of the outer liner connecting flange bushing opening, and wherein inner cowl connecting flange is arranged on an inner side of an inner cowl connecting flange root portion of the cowl structure, the inner dome connecting flange and the inner liner connecting flange are arranged on an outer side of the inner cowl connecting flange, and the outer surface of the inner connector head engages with both the inner surface of the inner dome connecting flange bushing opening and the inner surface of the inner liner connecting flange bushing opening.

Although the foregoing description is directed to some exemplary embodiments of the present disclosure, other variations and modifications will be apparent to those skilled in the art, and may be made without departing from the present disclosure. Moreover, features described in connection with one embodiment of the present disclosure may be used in conjunction with other embodiments, even if not explicitly stated above.

We claim:

1. A combustor for a gas turbine engine, the combustor comprising:

a dome structure including an outer dome connecting flange extending in a longitudinal direction with respect to a combustor centerline axis;

a cowl structure including an outer cowl connecting flange extending in the longitudinal direction with respect to the combustor centerline axis and having an outer cowl connecting flange opening extending through the outer cowl connecting flange;

an outer liner including an outer liner connecting flange extending in the longitudinal direction at an upstream end of the outer liner; and an outer connection connecting the outer dome connecting flange, the outer cowl connecting flange, and the outer liner connecting flange, wherein the outer liner connecting flange includes an outer liner connecting flange bushing having an outer liner connecting flange bushing opening therethrough, and the outer connection includes an outer connecting member having an outer connector head and an outer connector shank, an outer surface of the outer connector head slidingly engaging with an inner surface of the outer liner connecting flange bushing opening of the outer liner connecting flange bushing.

2. The combustor according to claim 1, wherein the outer liner is a ceramic matrix composite (CMC) outer liner, and the dome structure is a metallic dome structure and includes an outer dome connecting flange opening extending through the outer dome connecting flange.

3. The combustor according to claim 2, wherein the outer connecting member extends through the outer liner connecting flange bushing opening, through an outer dome connecting flange opening of the outer dome connecting flange, and through the outer cowl connecting flange opening.

4. The combustor according to claim 3, wherein the outer connector head is arranged at a first end of the outer connector shank and includes an outer connector shoulder, an outer connector retention member is connected to a second end of the outer connector shank opposite the outer connector head, the outer connector shoulder engages with an outer side of the outer dome connecting flange, and the outer connector retention member engages with an inner side of the outer cowl connecting flange.

5. The combustor according to claim 1, wherein the dome structure is a ceramic matrix composite (CMC) dome structure and the outer dome connecting flange includes an outer dome connecting flange bushing, and the outer liner is a CMC outer liner.

6. The combustor according to claim 5, wherein the outer cowl connecting flange is arranged on an inner side of an outer cowl connecting flange root portion of the cowl structure, the outer dome connecting flange and the outer liner connecting flange are arranged on an outer side of the outer cowl connecting flange, and the outer surface of the outer connector head engages with both an inner surface of the outer dome connecting flange bushing opening and the inner surface of the outer liner connecting flange bushing opening.

7. The combustor according to claim 5, wherein the outer cowl connecting flange is arranged on an outer side of an outer cowl connecting flange root portion of the cowl structure, the outer dome connecting flange and the outer liner connecting flange are arranged on an inner side of the outer cowl connecting flange, and the outer surface of the outer connector head engages with both an inner surface of an outer dome connecting flange bushing opening of the outer dome connecting flange bushing and the inner surface of the outer liner connecting flange bushing opening.

8. The combustor according to claim 5, wherein the outer dome connection further includes an outer connector bushing extending through an outer dome connecting flange bushing opening of the outer dome connecting flange bushing, an outer surface of the outer dome connector bushing slidingly engages with an inner surface of the outer dome connecting flange bushing opening, the outer connecting member extending through the outer dome connector bushing.

9. The combustor according to claim 8, wherein the outer connector head is arranged at a first end of the outer connector shank and includes an outer connector shoulder, the outer connector shoulder engages with an outer side of the outer cowl connecting flange, an outer side of the outer dome connector bushing engages with an inner side of the outer cowl connecting flange, and the outer connection further includes an outer connector retention member engaging with a second end of the outer connector shank, and a radial stop washer is arranged between the outer connector retention member and an inner side of the outer dome connector bushing.

10. The combustor according to claim 1, wherein the dome structure further includes an inner dome connecting flange extending in the longitudinal direction, and the cowl structure further includes an inner cowl connecting flange extending in the longitudinal direction and having an inner cowl connecting flange opening through the inner cowl connecting flange, the combustor further comprising:

an inner liner including an inner liner connecting flange extending in the longitudinal direction at an upstream end of the inner liner; and an inner connection connecting the inner dome connecting flange, the inner cowl connecting flange, and the inner liner connecting flange, wherein the inner liner connecting flange includes an inner liner connecting flange bushing having an inner liner connecting flange bushing opening therethrough, and the inner connection includes an inner connecting member having an inner connector head and an inner connector shank, an outer surface of the inner connector head slidingly engaging with an inner surface of the inner liner connecting flange bushing opening of the inner liner connecting flange bushing.

11. The combustor according to claim 10, wherein at least one of the outer connecting member or the inner connecting member includes (1) a thermal activation opening extending therethrough, and (2) a torque cavity arranged within one of the outer connector head and the inner connector head.

12. The combustor according to claim 10, wherein the inner liner is a ceramic matrix composite (CMC) inner liner, and the dome structure is a metallic dome structure and includes an inner dome connecting flange opening extending through the inner dome connecting flange, the inner connecting member extends through the inner liner connecting flange bushing opening, through an inner dome connecting flange opening of the inner dome connecting flange, and through the inner cowl connecting flange opening.

13. The combustor according to claim 10, wherein the dome structure is a ceramic matrix composite (CMC) dome structure and the inner dome connecting flange includes an inner dome connecting flange bushing, and the inner liner is a CMC inner liner.

14. The combustor according to claim 13, wherein the inner connection further includes an inner connector bushing extending through an inner dome connecting flange bushing opening of the inner dome connecting flange bushing and having an outer surface that slidingly engages with the inner surface of the inner dome connecting flange bushing opening, the inner connecting member extending through the inner dome connector bushing.

15. The combustor according to claim 13, wherein the inner cowl connecting flange is arranged on an outer side of an inner cowl connecting flange root portion of the cowl structure, the inner dome connecting flange and the inner liner connecting flange are arranged on an inner side of the inner cowl connecting flange, and the outer surface of the inner connector head engages with both an inner surface of an inner dome connecting flange bushing opening of the inner dome connecting flange bushing and the inner surface of the inner liner connecting flange bushing opening.

16. The combustor according to claim 13, wherein the inner cowl connecting flange is arranged on an inner side of an inner cowl connecting flange root portion of the cowl structure, the inner dome connecting flange and the inner liner connecting flange are arranged on an outer side of the inner cowl connecting flange, and the outer surface of the inner connector head engages with both an inner surface of an inner dome connecting flange bushing opening of the inner dome connecting flange bushing and the inner surface of the inner liner connecting flange bushing opening.

* * * * *